US005454104A

United States Patent [19]
Steidlmayer et al.

[11] Patent Number: 5,454,104
[45] Date of Patent: Sep. 26, 1995

[54] FINANCIAL DATA EVENT FLOW ANALYSIS SYSTEM WITH STUDY CONDUCTOR DISPLAY

[75] Inventors: J. Peter Steidlmayer, Wilmette; Gordon Kummel, Evanston, both of Ill.

[73] Assignee: Steidlmayer Software, Inc., Chicago, Ill.

[21] Appl. No.: 22,539

[22] Filed: Feb. 25, 1993

[51] Int. Cl.[6] .................................................. G06F 17/30
[52] U.S. Cl. .................. 395/600; 364/408; 364/224.2; 364/282.1; 364/225; 364/227.2; 364/918.8; 364/974; 364/DIG. 4; 364/DIG. 2; 395/141
[58] Field of Search ............................... 395/600, 141; 364/408

[56] References Cited

U.S. PATENT DOCUMENTS

| | | |
|---|---|---|
| 3,296,597 | 1/1967 | Scantlin et al. . |
| 3,462,739 | 8/1969 | Scantlin et al. . |
| 3,493,956 | 2/1970 | Andrews et al. . |
| 3,559,207 | 1/1971 | Atkinson . |
| 3,573,732 | 4/1971 | Greenblum et al. . |
| 3,648,270 | 3/1972 | Metz et al. . |
| 3,651,511 | 3/1972 | Andrews et al. . |
| 3,656,148 | 4/1972 | Belcher et al. . |
| 3,739,222 | 6/1973 | Hurd, III . |
| 3,739,369 | 6/1973 | Bunker et al. . |
| 3,742,482 | 6/1973 | Albrecht et al. . |
| 3,792,462 | 2/1974 | Casey et al. . |
| 3,913,089 | 10/1975 | Albrecht . |
| 4,193,122 | 3/1980 | Bowers . |
| 4,307,393 | 12/1981 | Hamada et al. . |
| 4,473,824 | 9/1984 | Claytor . |
| 4,674,044 | 6/1987 | Kalmus et al. . |
| 4,847,785 | 7/1989 | Stephens . |

OTHER PUBLICATIONS

P. Kaufman, *The New Commodity Trading System and Methods* (1987, John Wiley & Sons, Inc.) at pp. 1–27, 54–90, 159–206.

N. Rothstein, *The Handbook of Financial Futures* (1984, McGraw–Hill Book Company) at pp. vii–xix, 333–372.
T. Meyers, *The Technical Analysis Course* (1989, Probus Publ. Co.).
*The Signal Guide to Investment Software* (1991, Data Broadcasting Corporation).
*The Individual Investor's Guide to Computerized Investing* (1992, The American Association of Individual Investors) at pp. 1–385.

(List continued on next page.)

*Primary Examiner*—Thomas G. Black
*Assistant Examiner*—Paul R. Lintz
*Attorney, Agent, or Firm*—Schiff Hardin & Waite

[57] ABSTRACT

A system for controlling and managing a continuous sequence of data by conducting studies on user-defined segments of the data, and displaying the study results in a concentrated summary form in vertical pipes on a single display screen. The system includes a data stream source, an interface between the data stream source and a personal computer or other stand-alone device, and means for constructing a database for the continuously developing data and displaying the data in a horizontal display, software and hardware to enable a user to conduct studies on the data so configured. The user designates a specific segment of displayed data, a specific study to be performed on that segment, and the study parameters, a color for each study result, and the position and color of a vertical summary pipe on the display screen. The study is performed and displayed in a concentrated summary form in the vertical pipe. A user may conduct multiple studies and display the study results in the same, or a different, vertical pipe on the same screen. Through the use of the vertical pipes for the display of study results, and the locating of space or color segment differences within a result or between such results, the system can be used flexibly to analyze, model, and summarize large quantities of data in a concentrated form on a single screen, thereby providing the user with important information about the studied data, giving the user modelling power and definitional control over the data, and enabling the user to draw analytical conclusions and make transaction decisions.

23 Claims, 44 Drawing Sheets

OTHER PUBLICATIONS

Wall Street Computer Review's *Special Buyer's Guide Issue for 1992* (Gralla Publications).

Edward R. Tufte, *Envisioning Information* (1990, Graphics Press).

Edward R. Tufte, *The Visual Display of Quantitative Information* (1983, Graphics Press).

J. Peter Steidlmayer, *New Market Discoveries* (1990, Kirbmarn).

Capital Flow Software User Reference Manual, Version 2.0.

Barbara Robertson, "Biz Viz. (financial analysts are beginning to use visualization tools normally used by engineers)", *Computer Graphics World*, vol. v14, Issue: n9, Sep. 1991, pp. 45–49.

Clive Davidson, "Fast Money", *Computer Weekly*, Oct. 17, 1991, pp. 28–29.

Paul R. Lintz, *Examiner's Exhibit A*, Unpublished Output from *Microsoft Works* Aug. 14, 1994, pp. 1–2.

*Microsoft Works User's Guide Version 1.05*, Microsoft corporation 1987, 1988, pp. 257–335.

Rizzo et al., "Quotron Uses Windows to Develop New Market Analysis Tools For Real–Time Data", *Microsoft Systems Journal*, vol. V4, Issue: n1, Jan., 1989, pp. 1–9.

Ivy Schmerken, "Technical Charting Lights Up Securities Trading", *Wall Street Computer Review*, vol. v6, Issue: n9, Jun. 1989, pp. 42–52.

Janet Matthew, "OTC Spurs Specialized Trading Systems", *Wall Street Computer Review*, vol. v6, Issue: n12, Sep., 1989, pp. 26–32.

1990 Buyer's Guide: "Trading Systems", *Wall Street Computer Review*, vol. v7, Issue: n2, Nov., 1989, pp. 124–131.

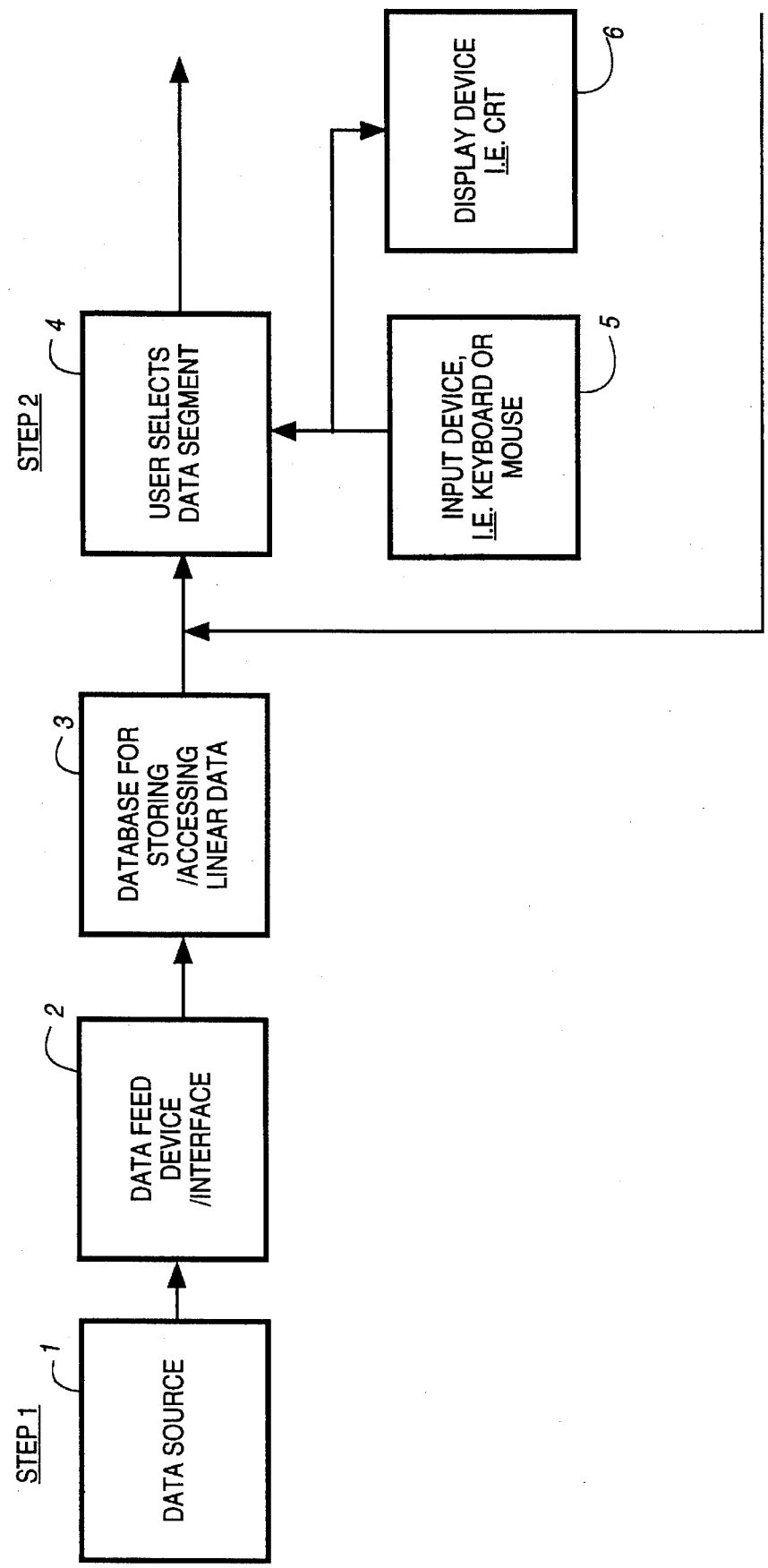
FIG. 1-A

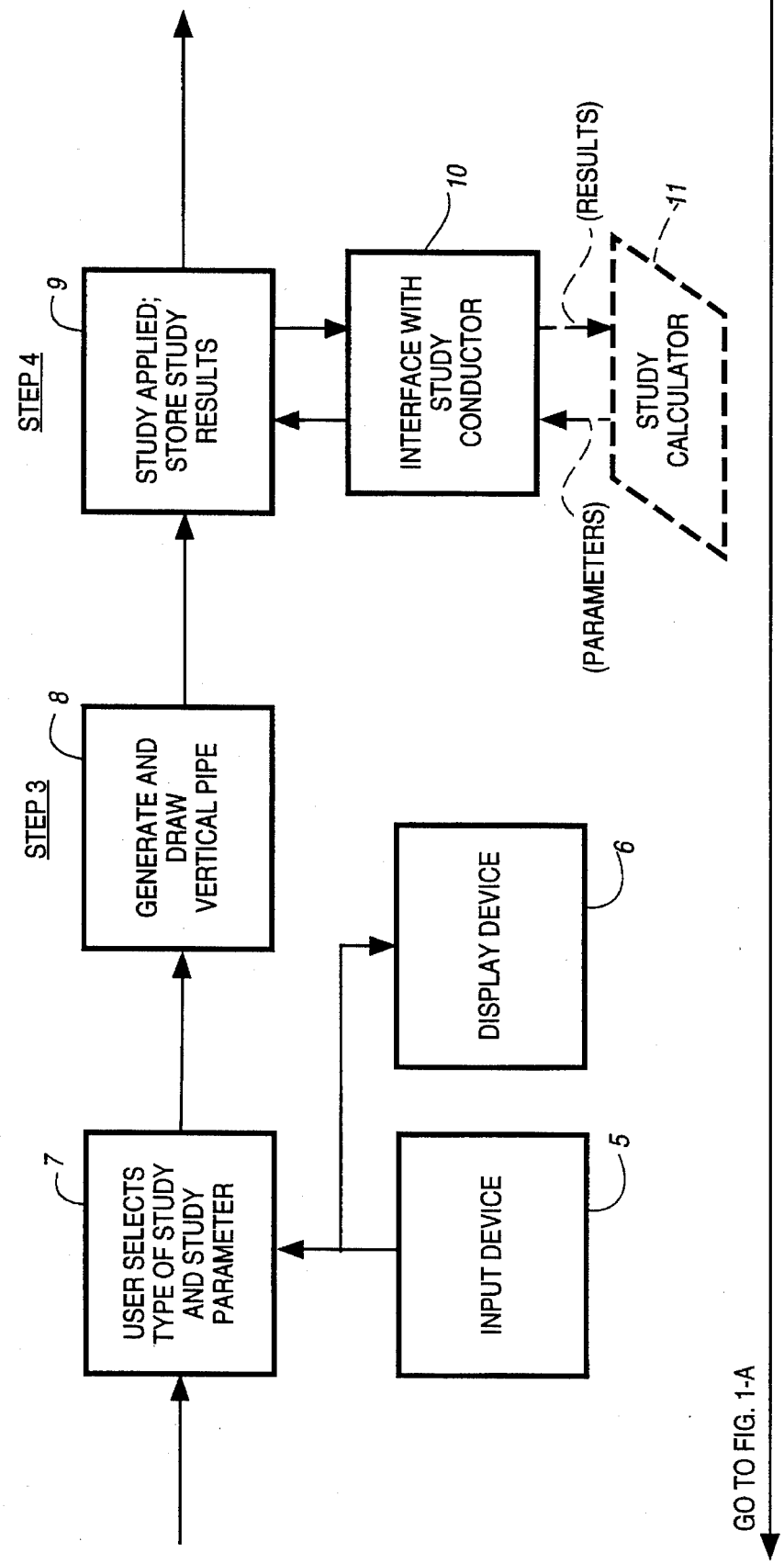

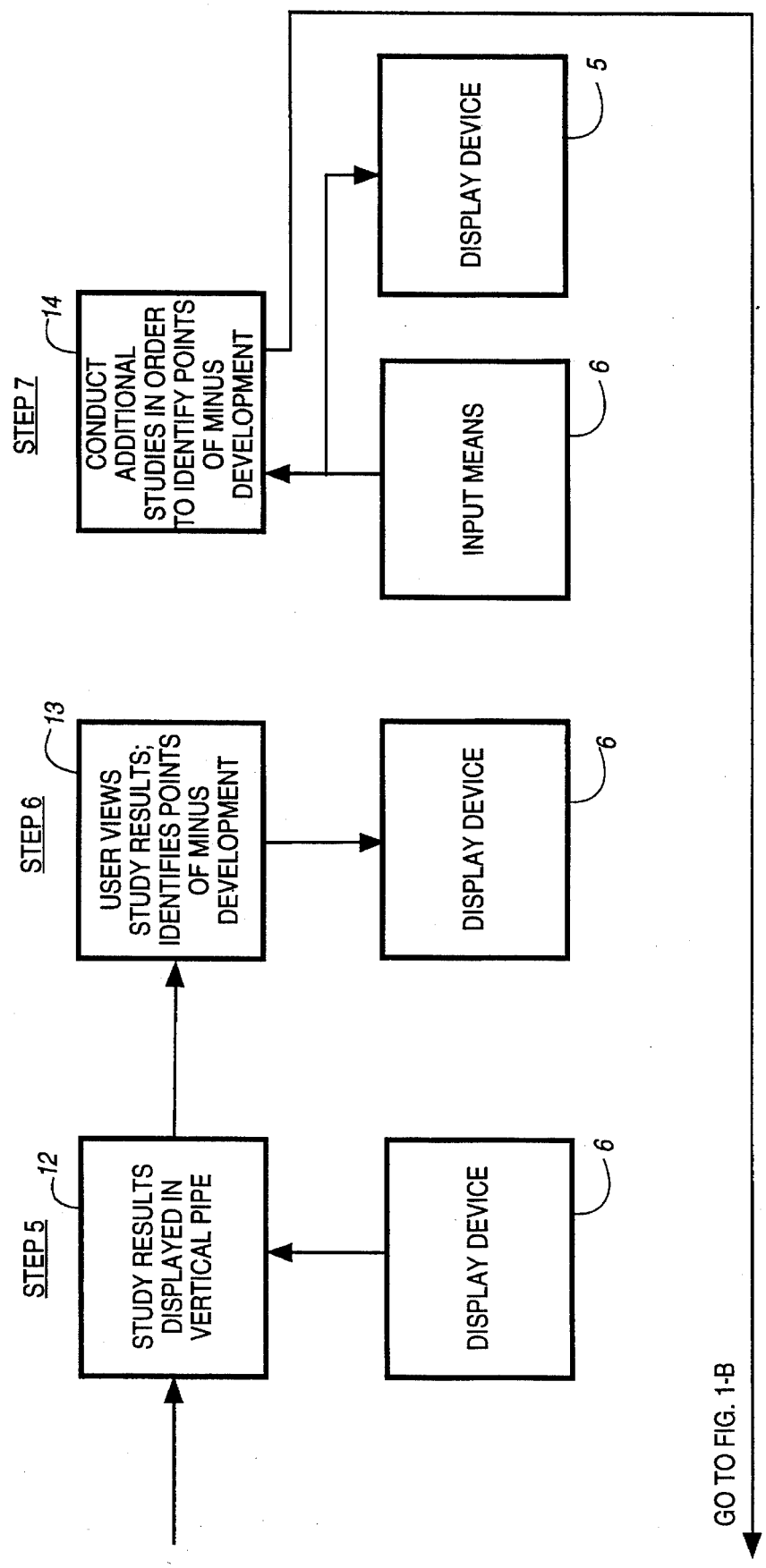

FIG. 3-A
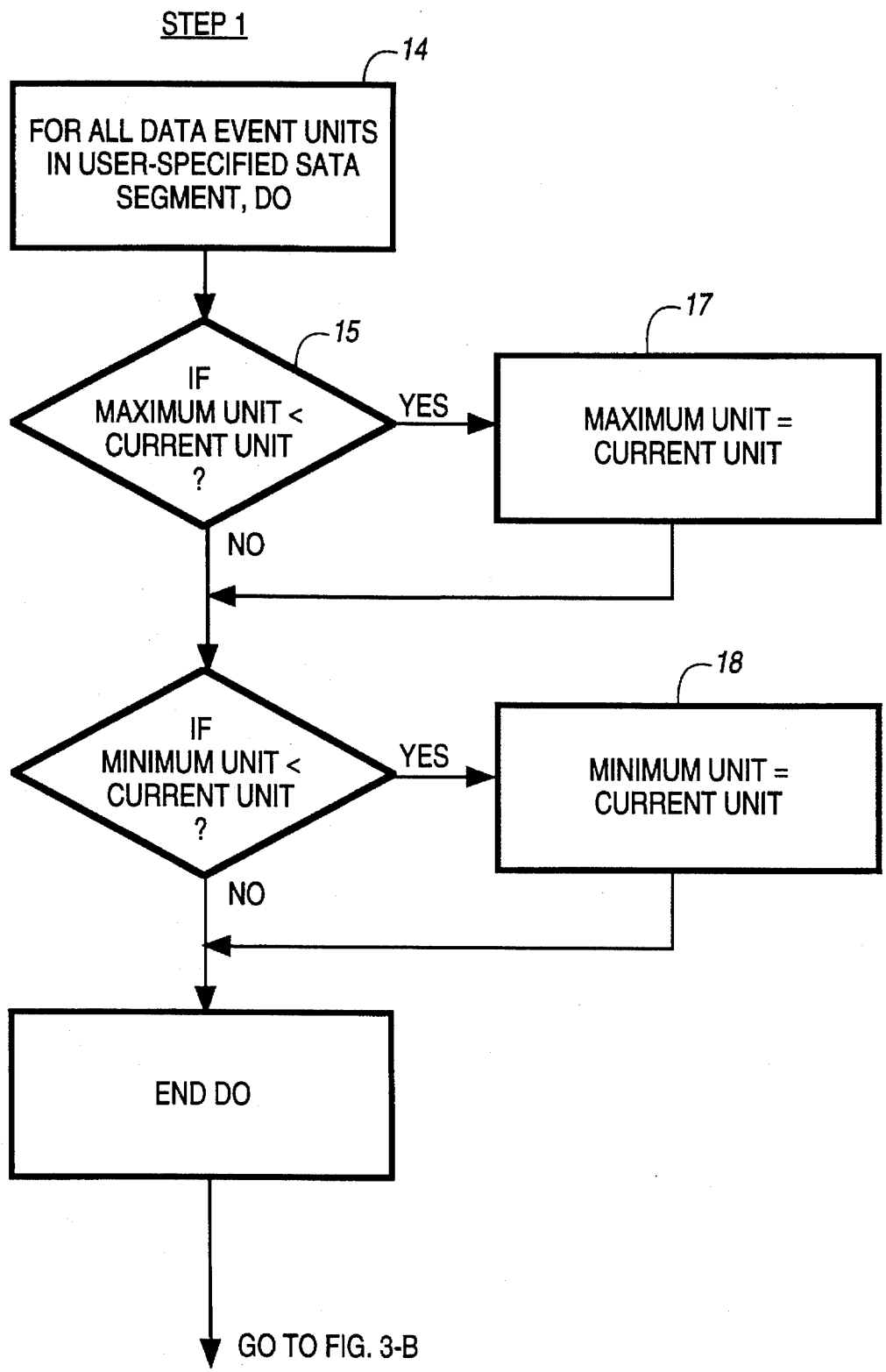

FIG. 3-B
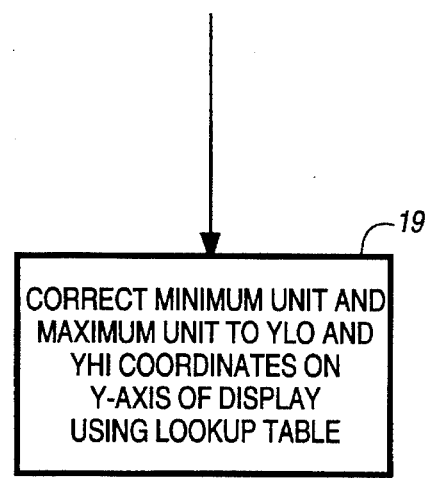
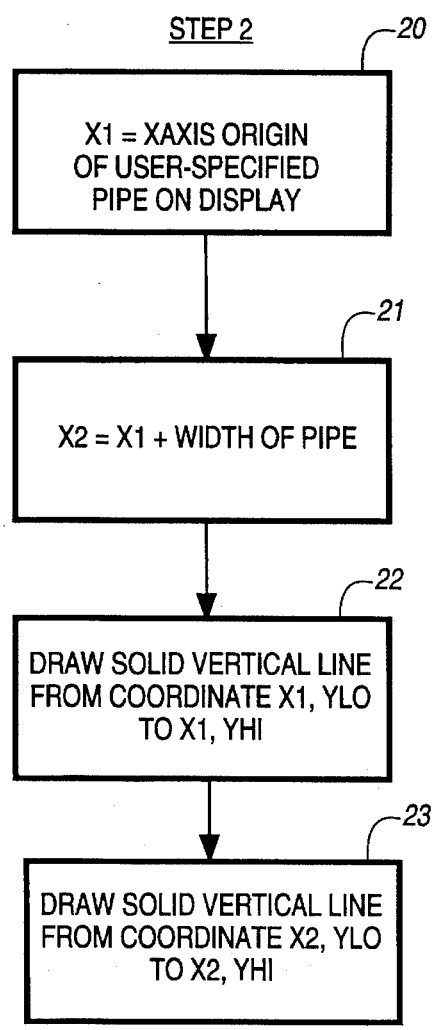
GO TO FIG. 3-C

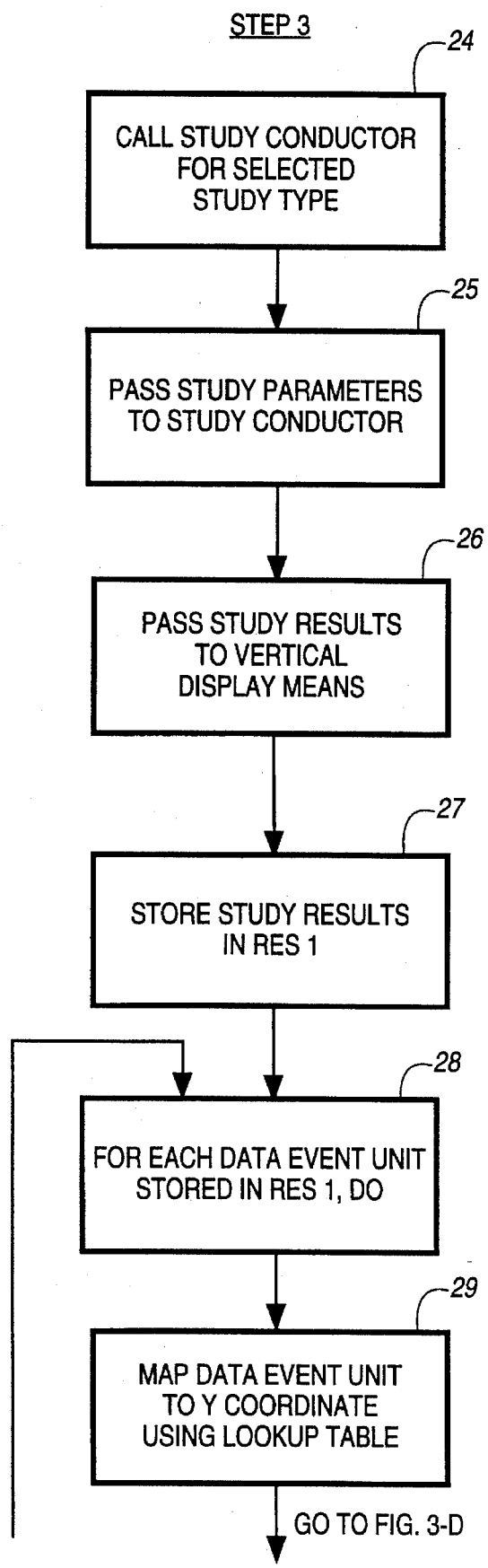
FIG. 3-C

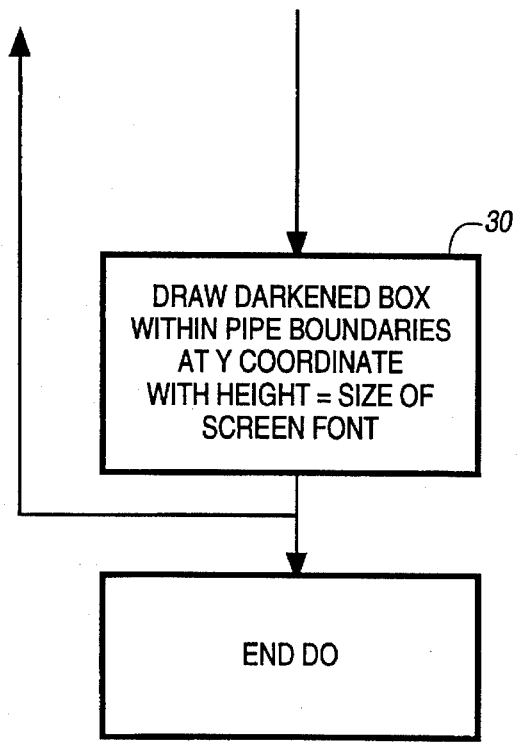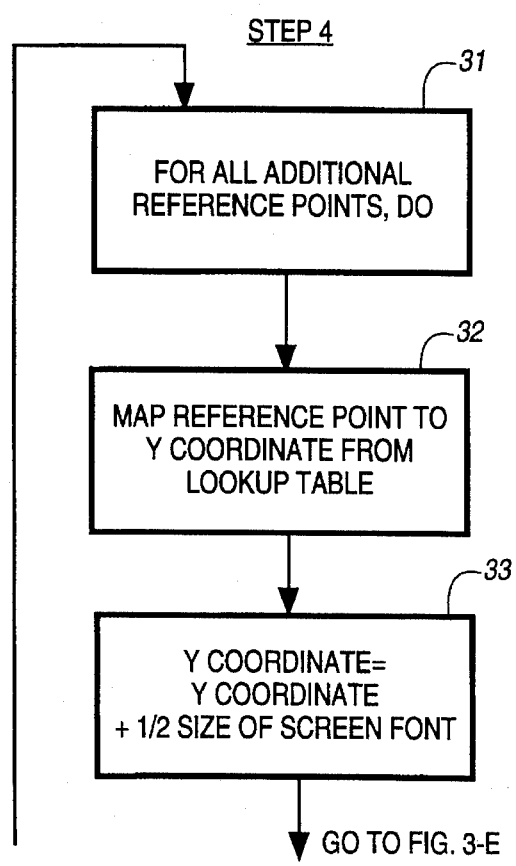
FIG. 3-D

FIG. 3-E
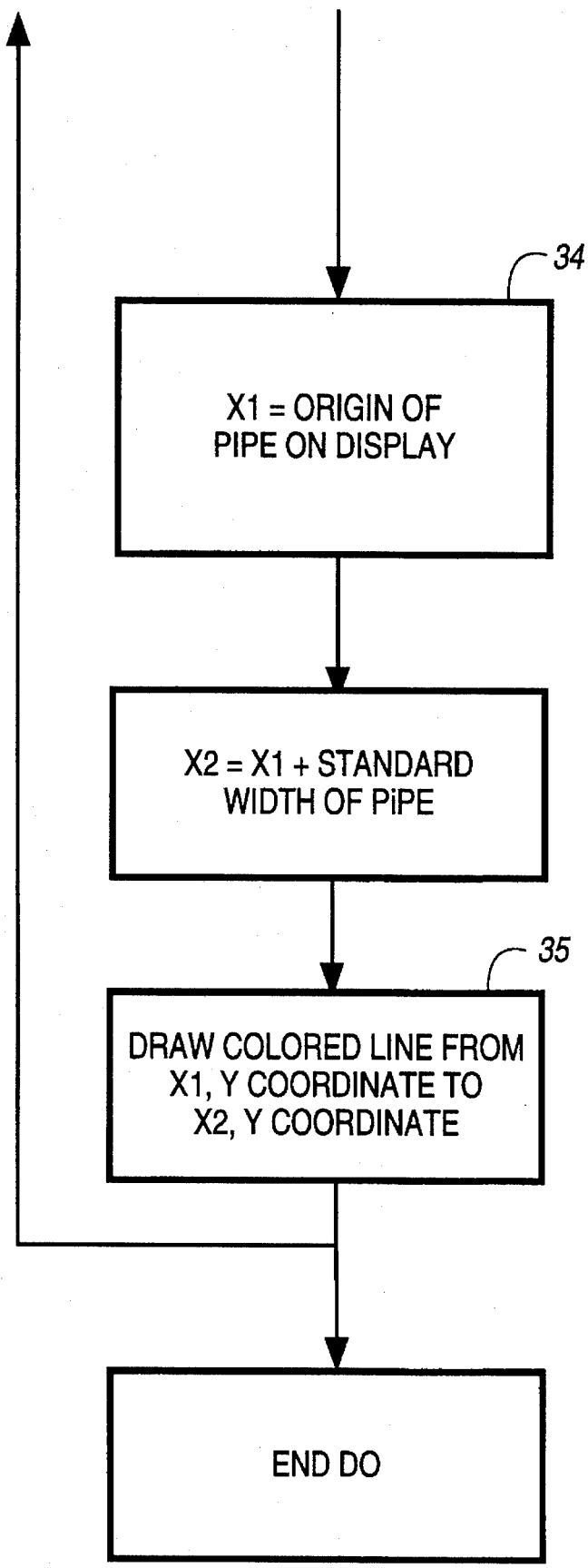

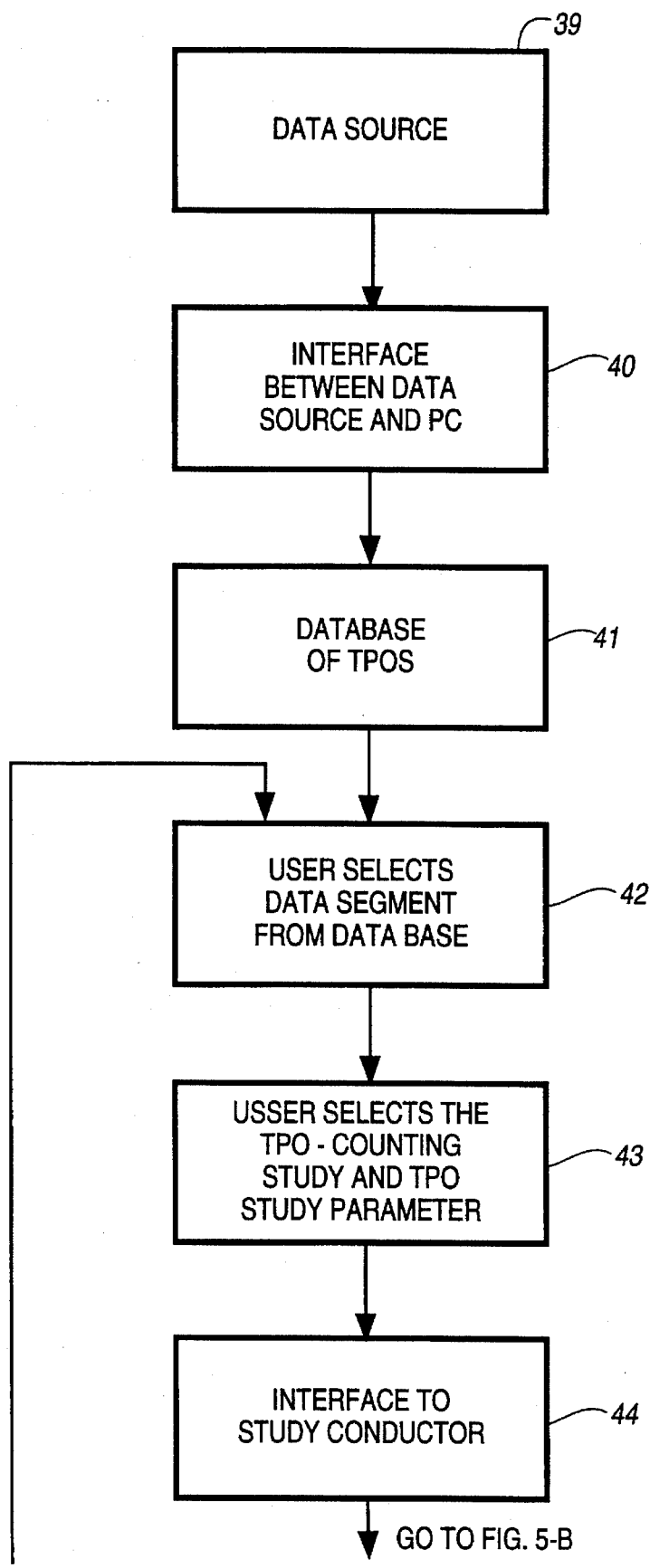
FIG. 5-A

FIG. 5-B
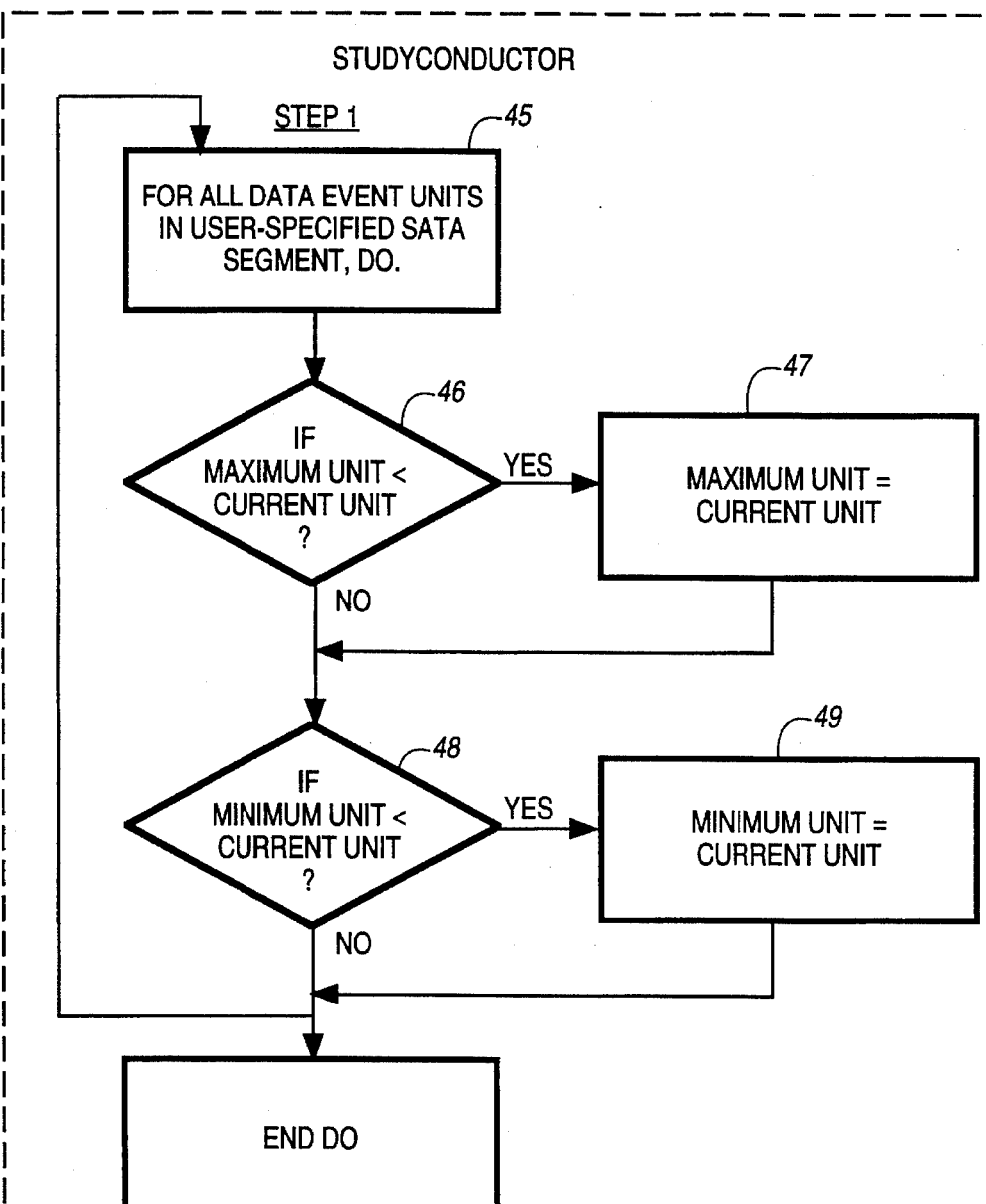

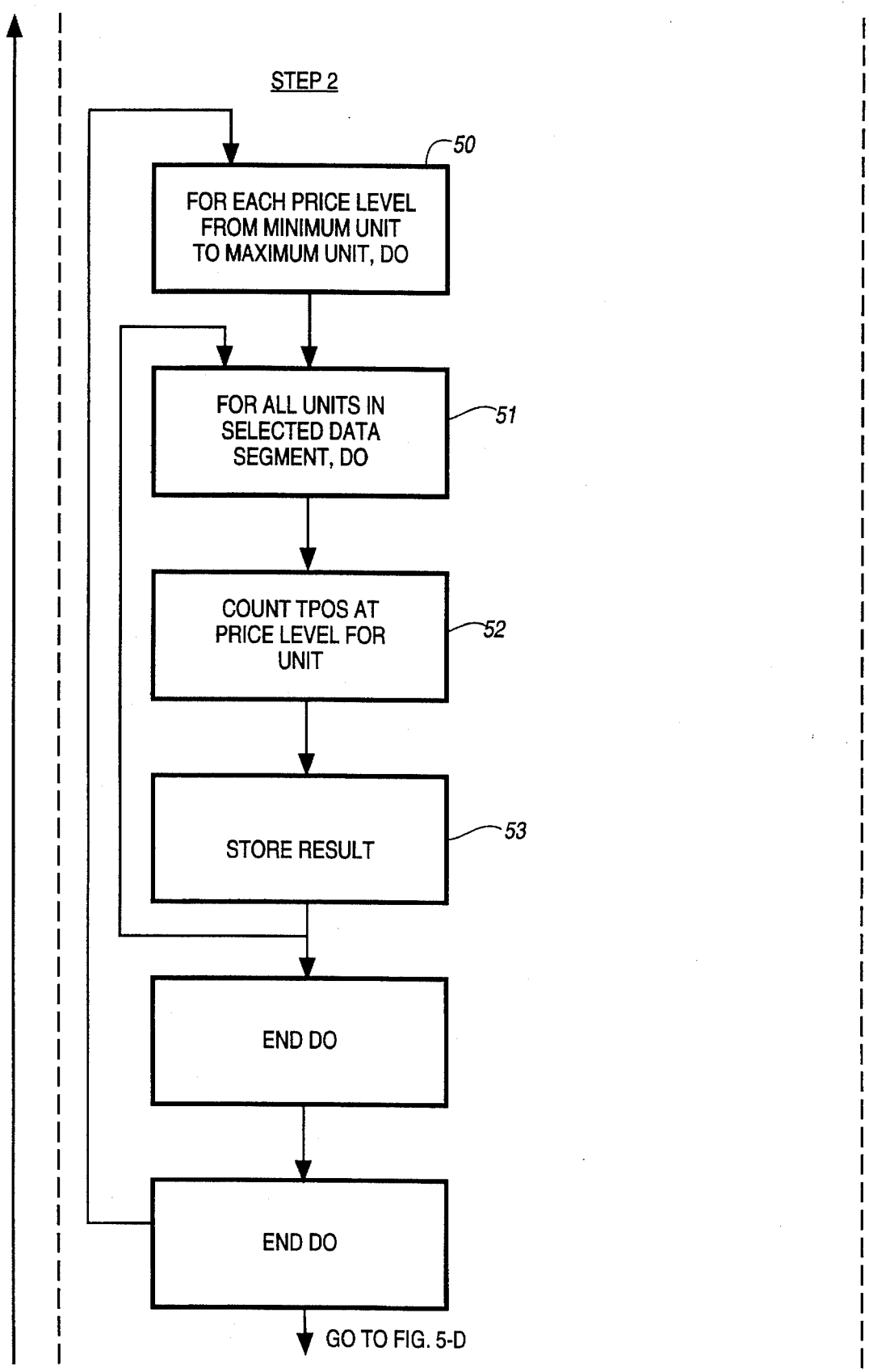
FIG. 5-C

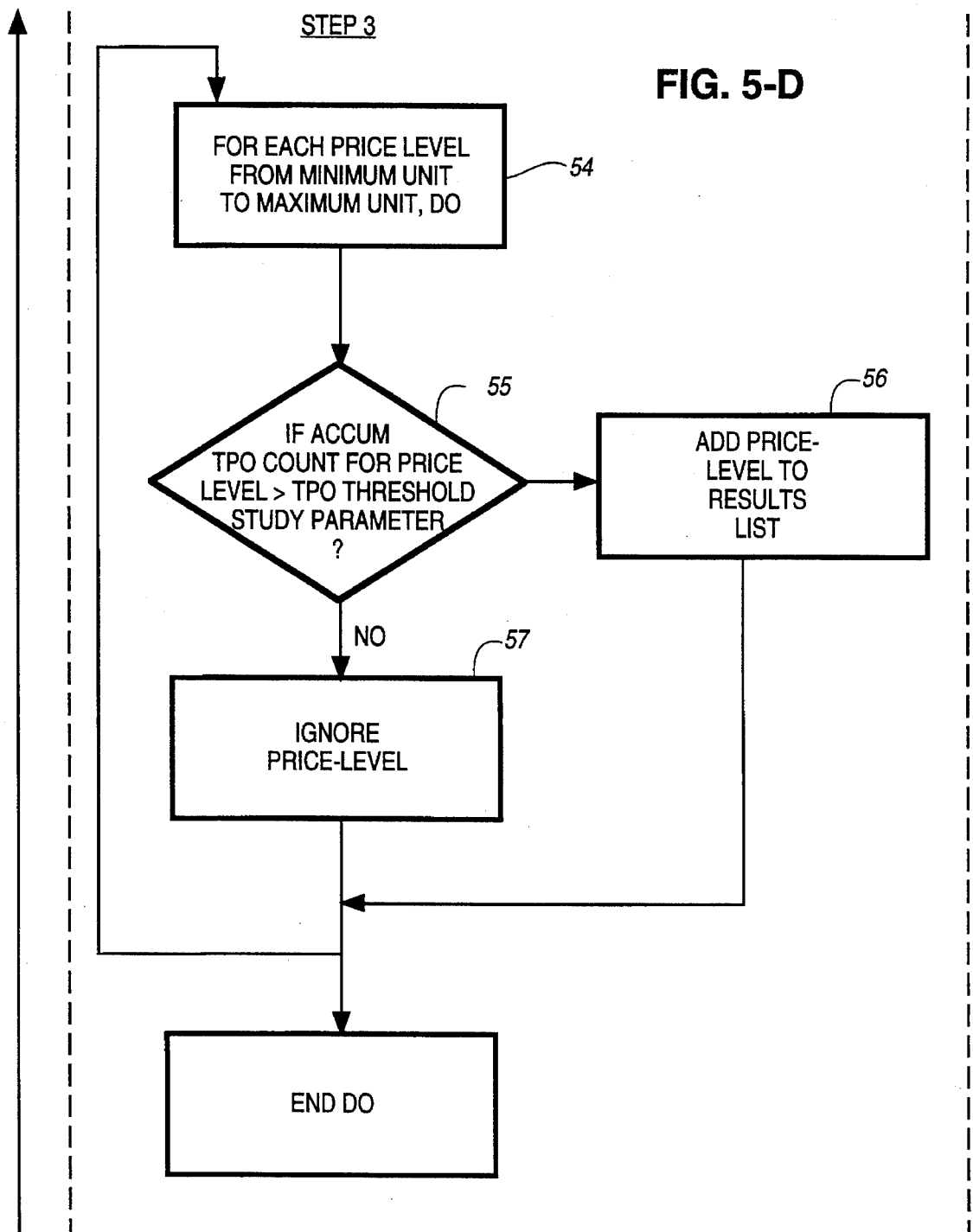
FIG. 5-D
GO TO FIG. 3-E

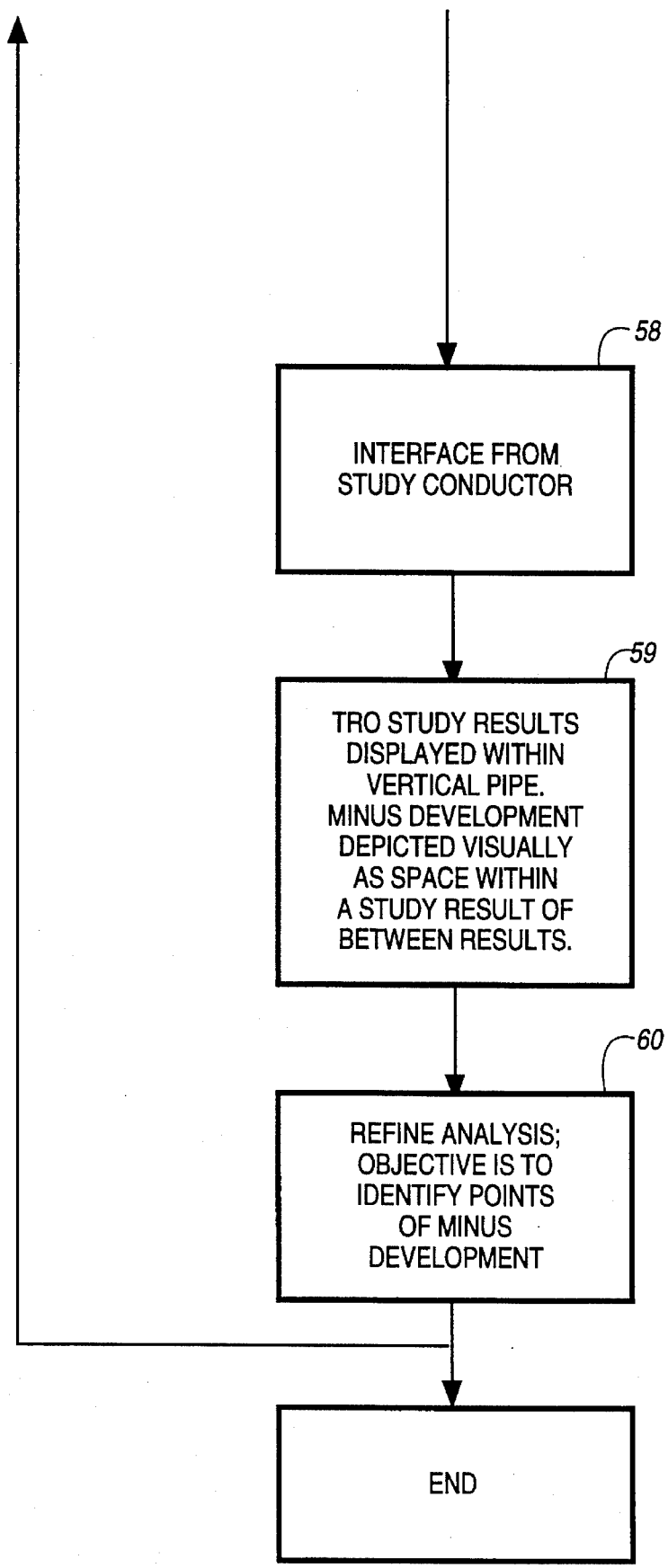
FIG. 5-E

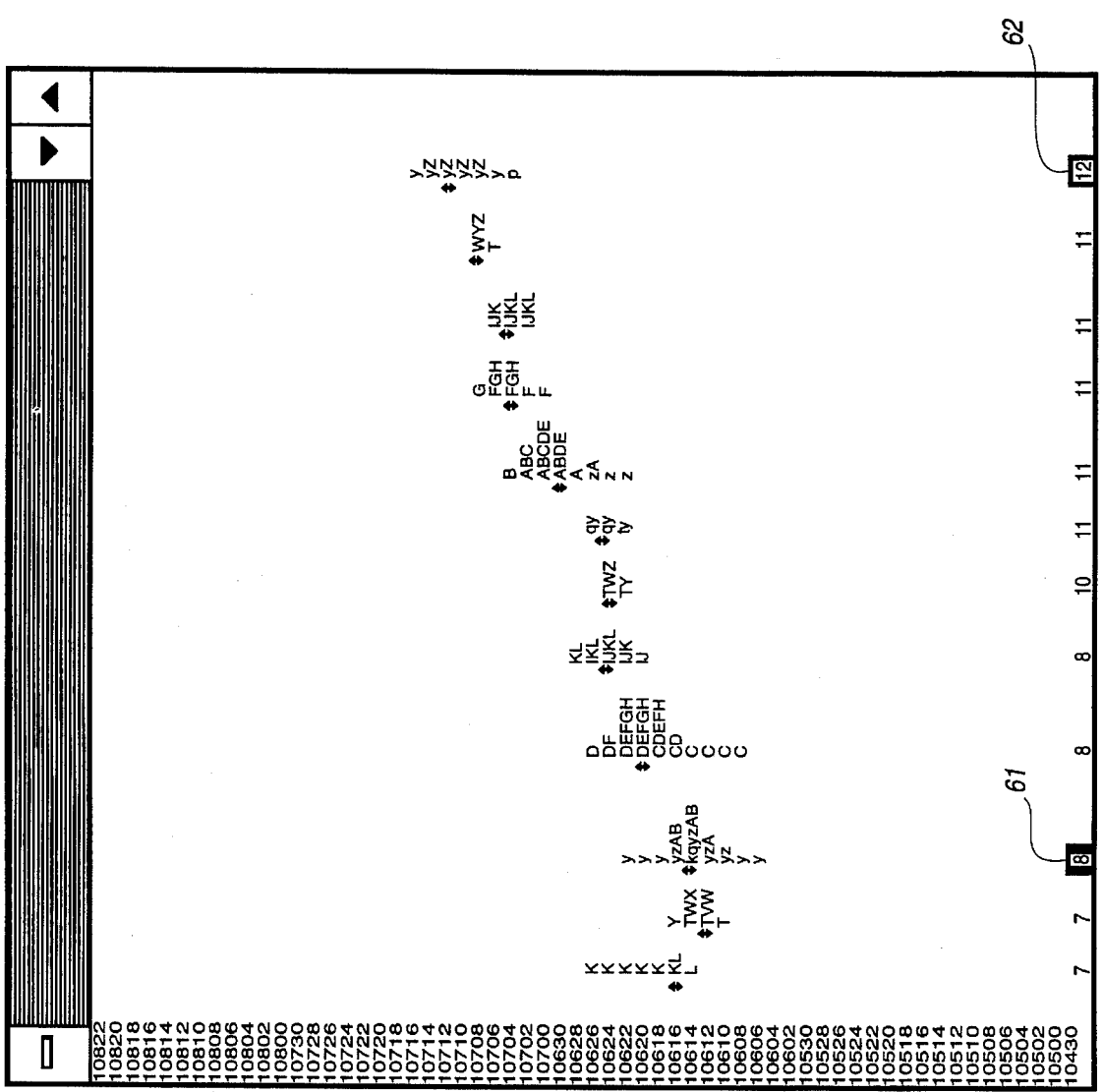
FIG. 6-A

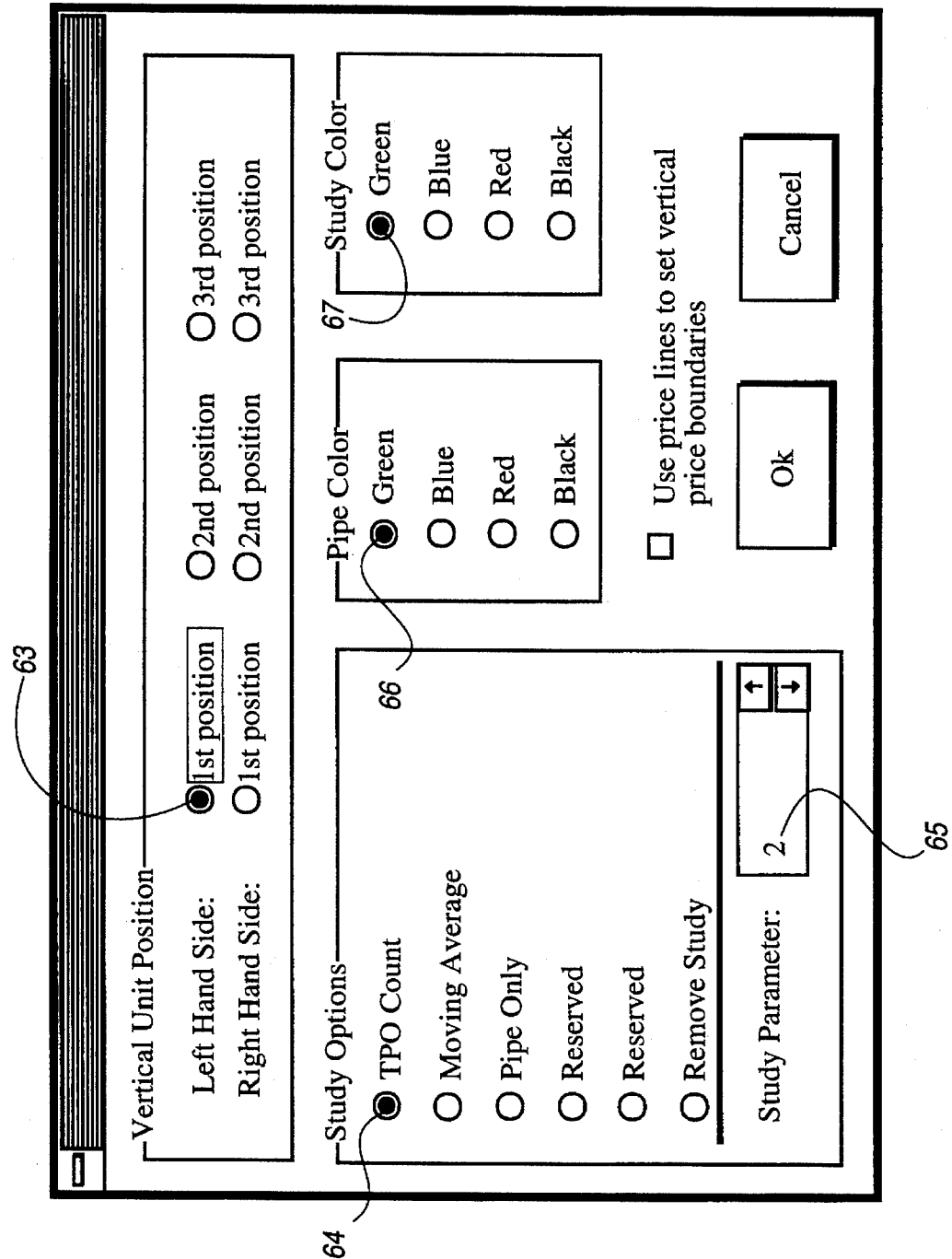
FIG. 6-B

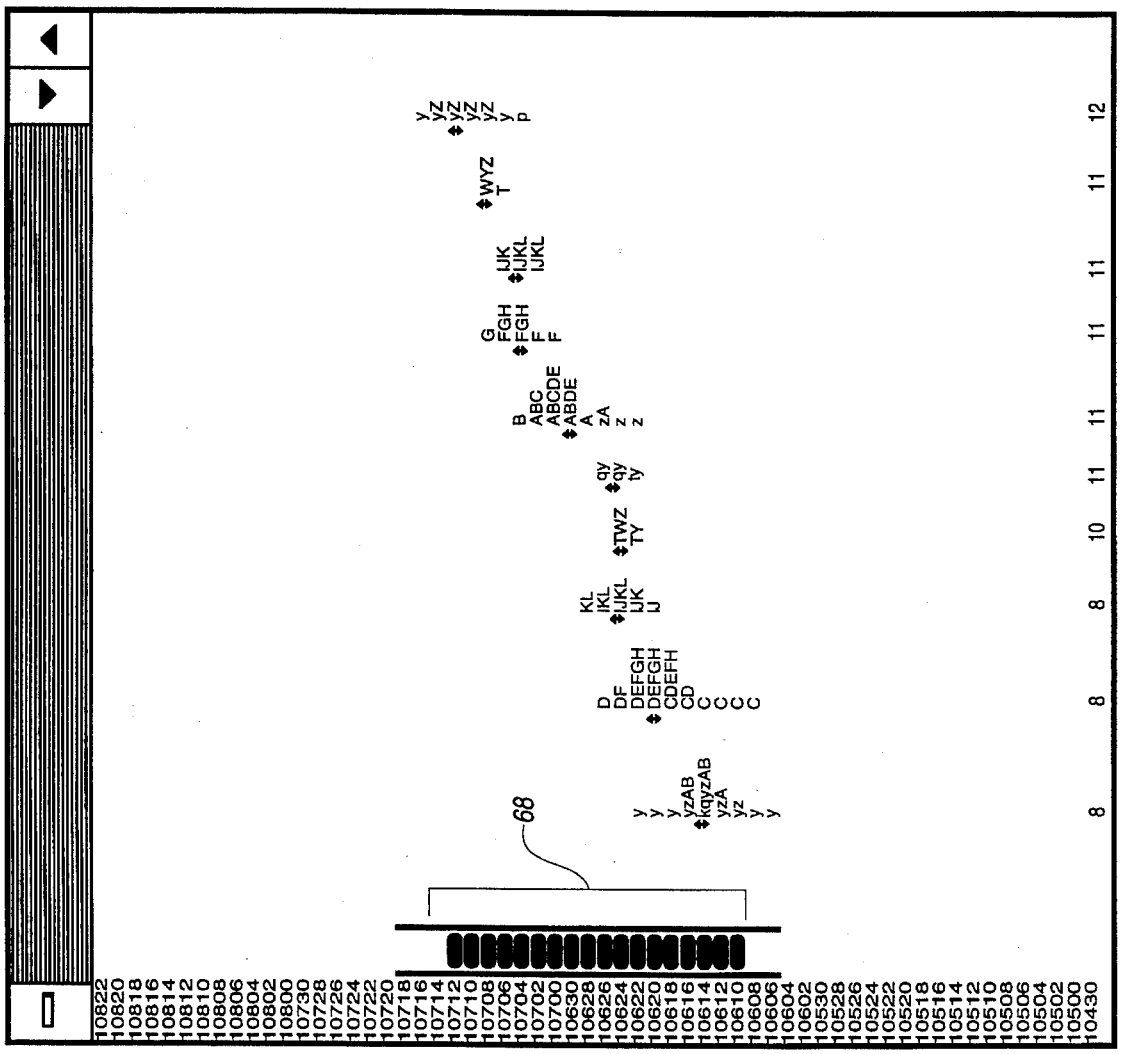
FIG. 6-C

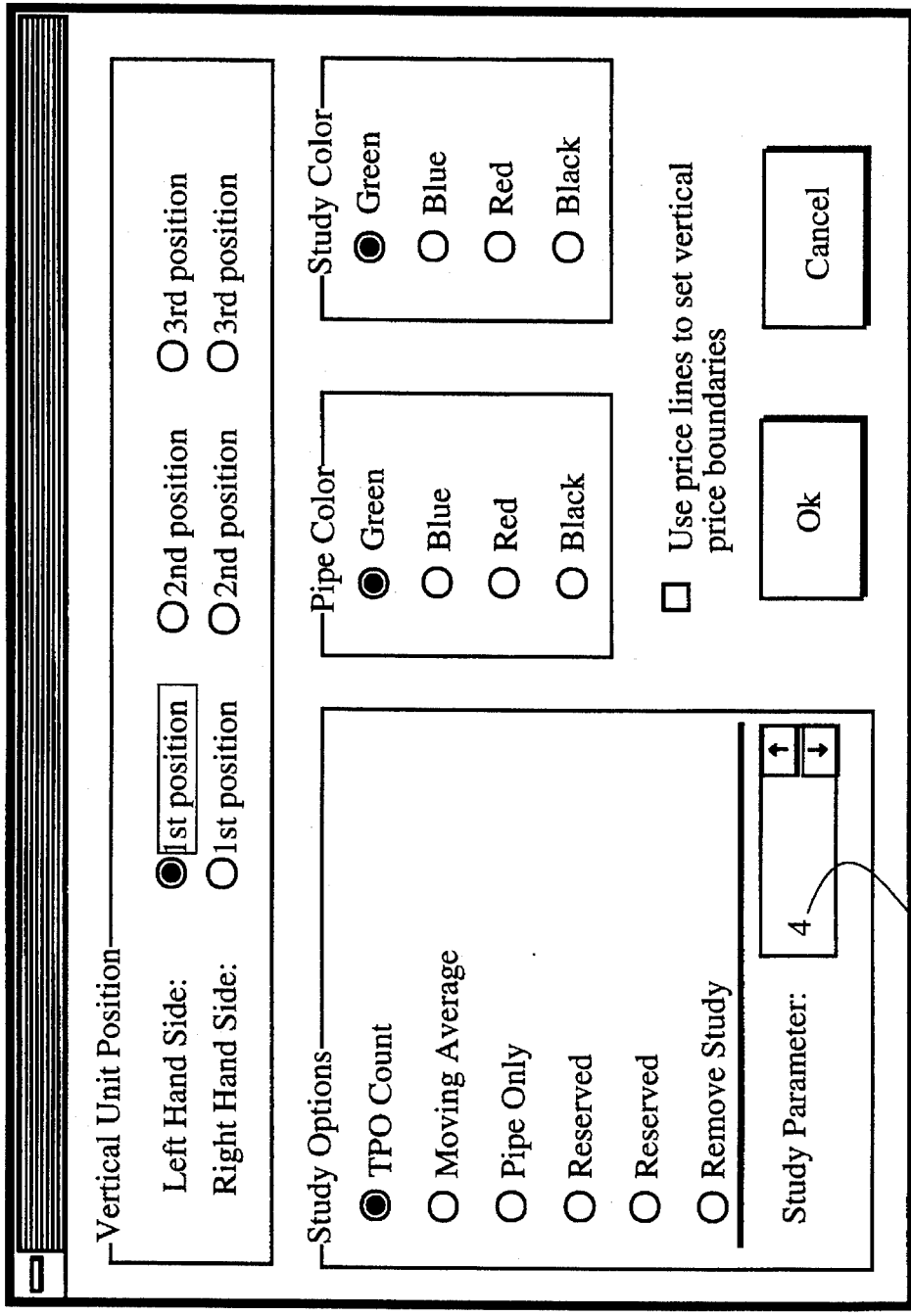
FIG. 6-D

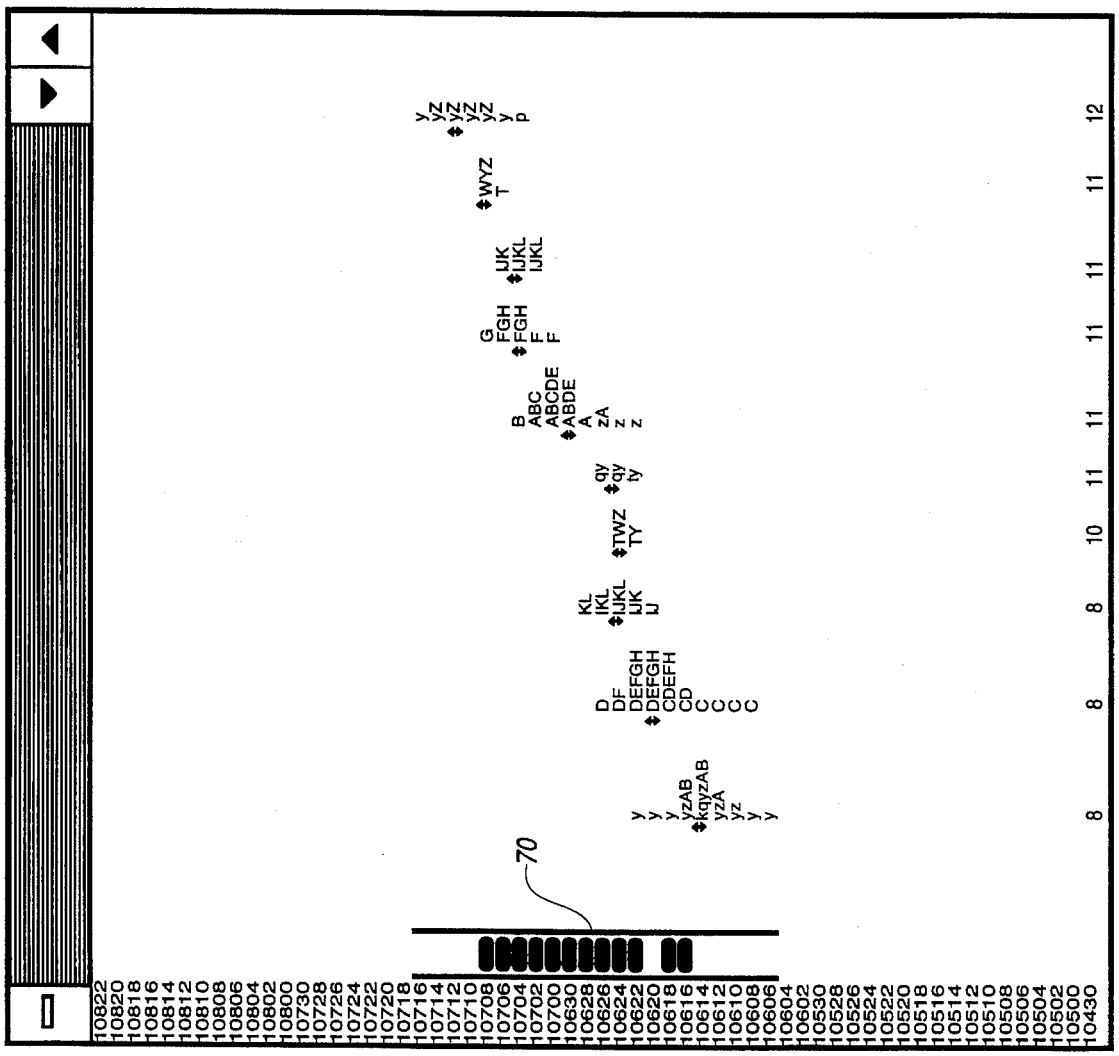
FIG. 6-E

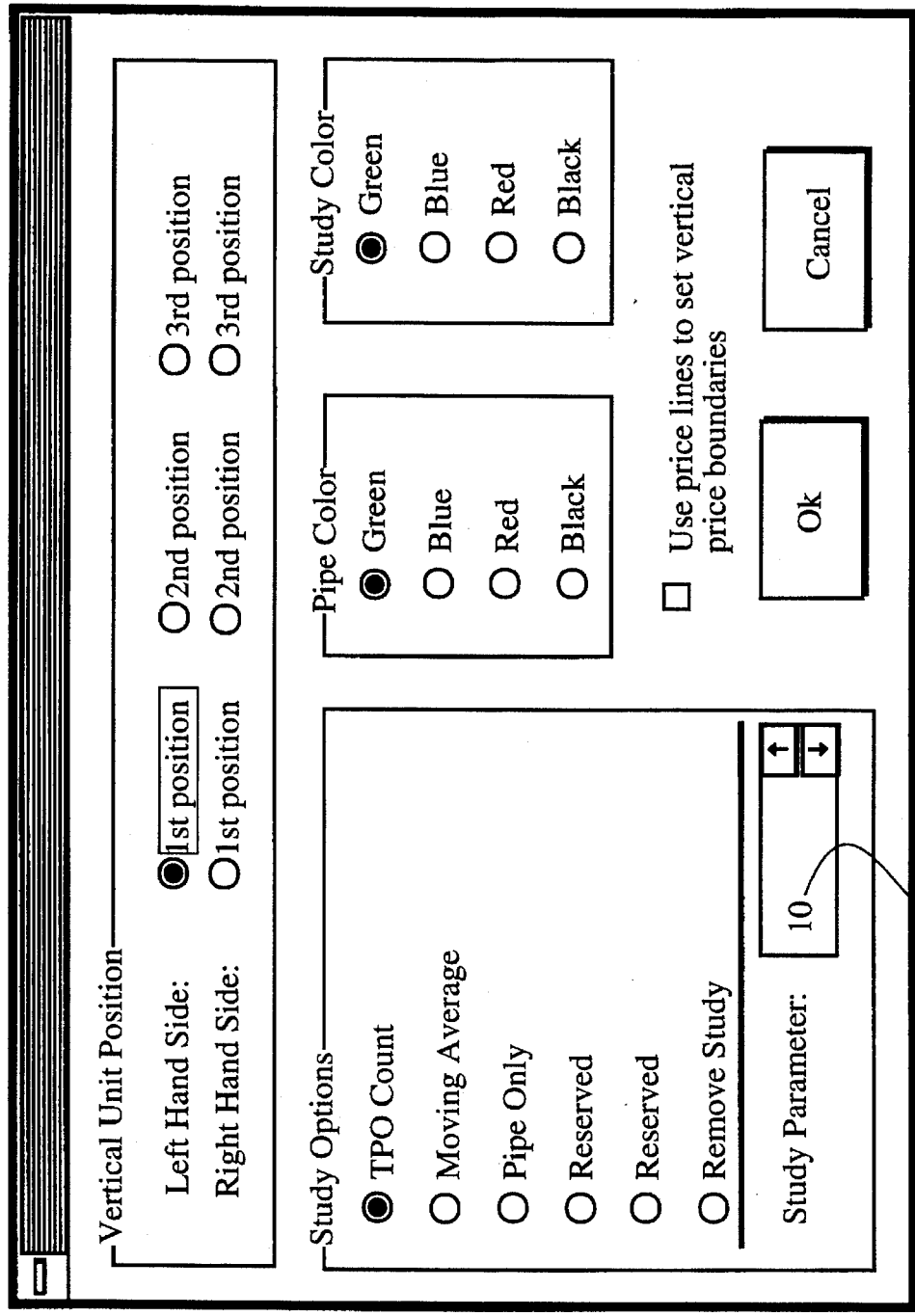
FIG. 6-F

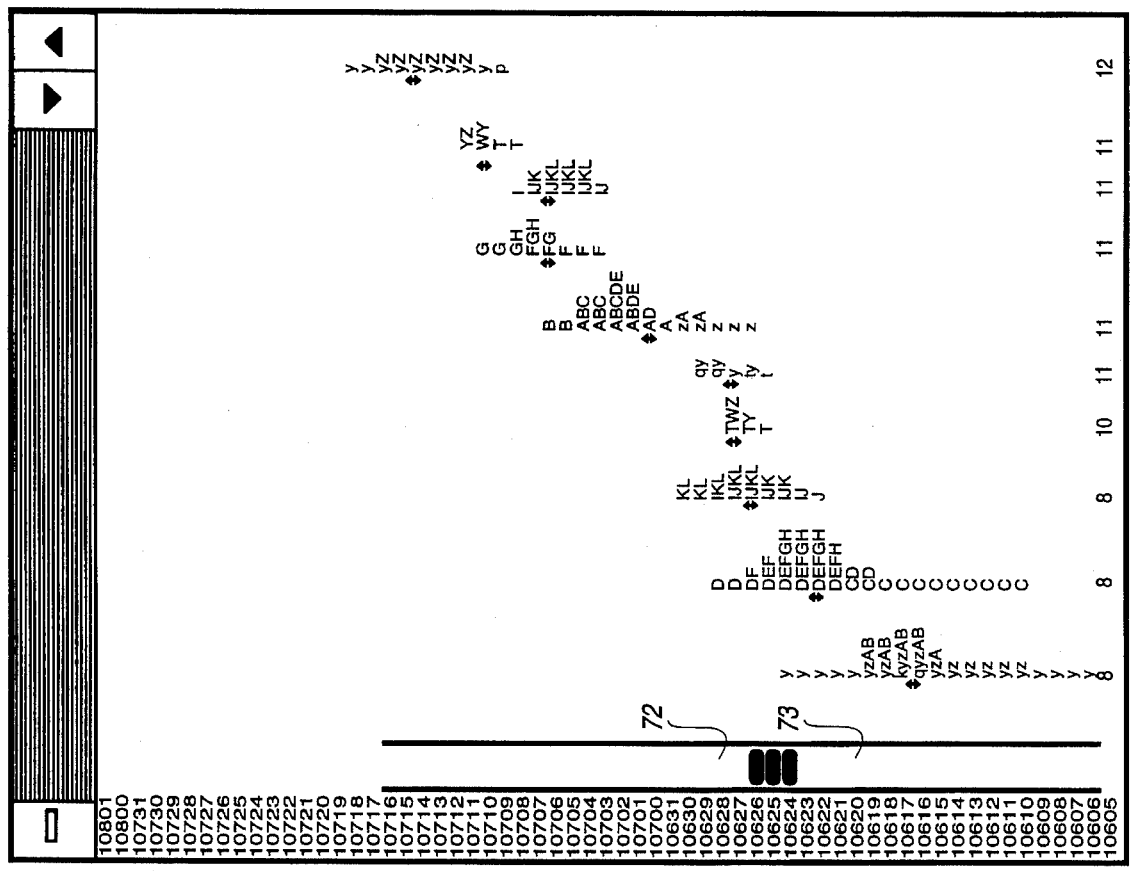
FIG. 6-G

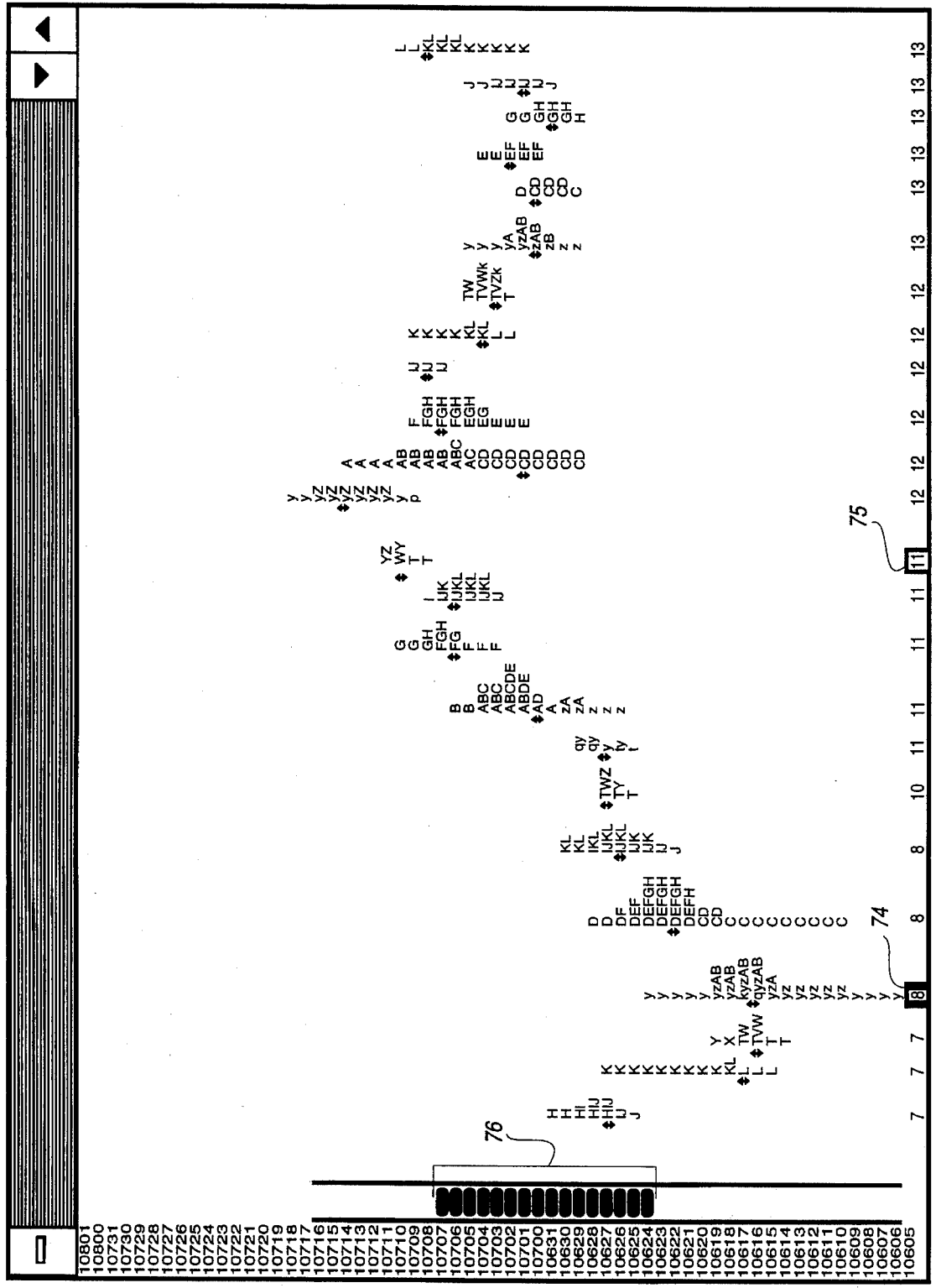
FIG. 7-A

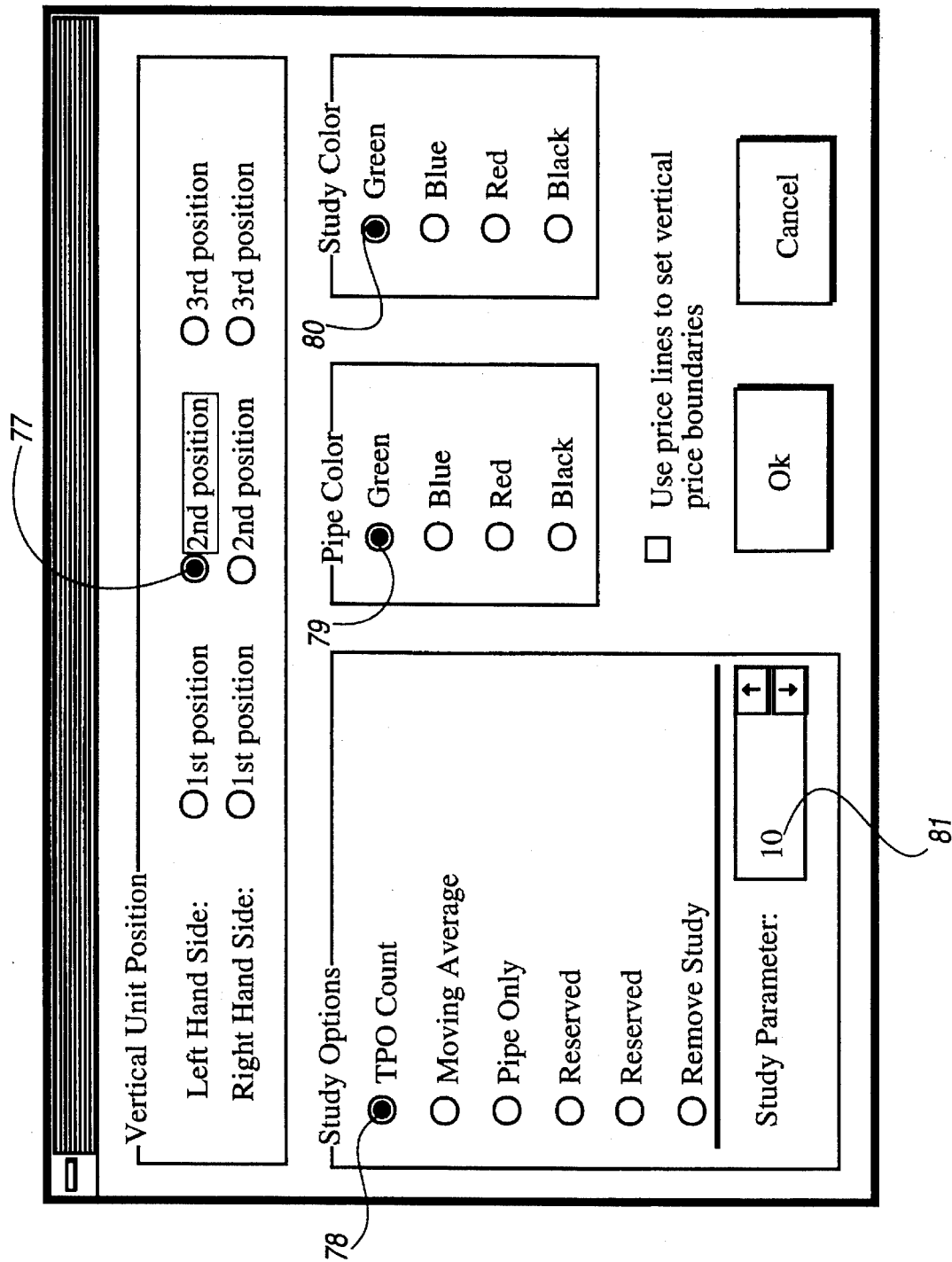
FIG. 7-B

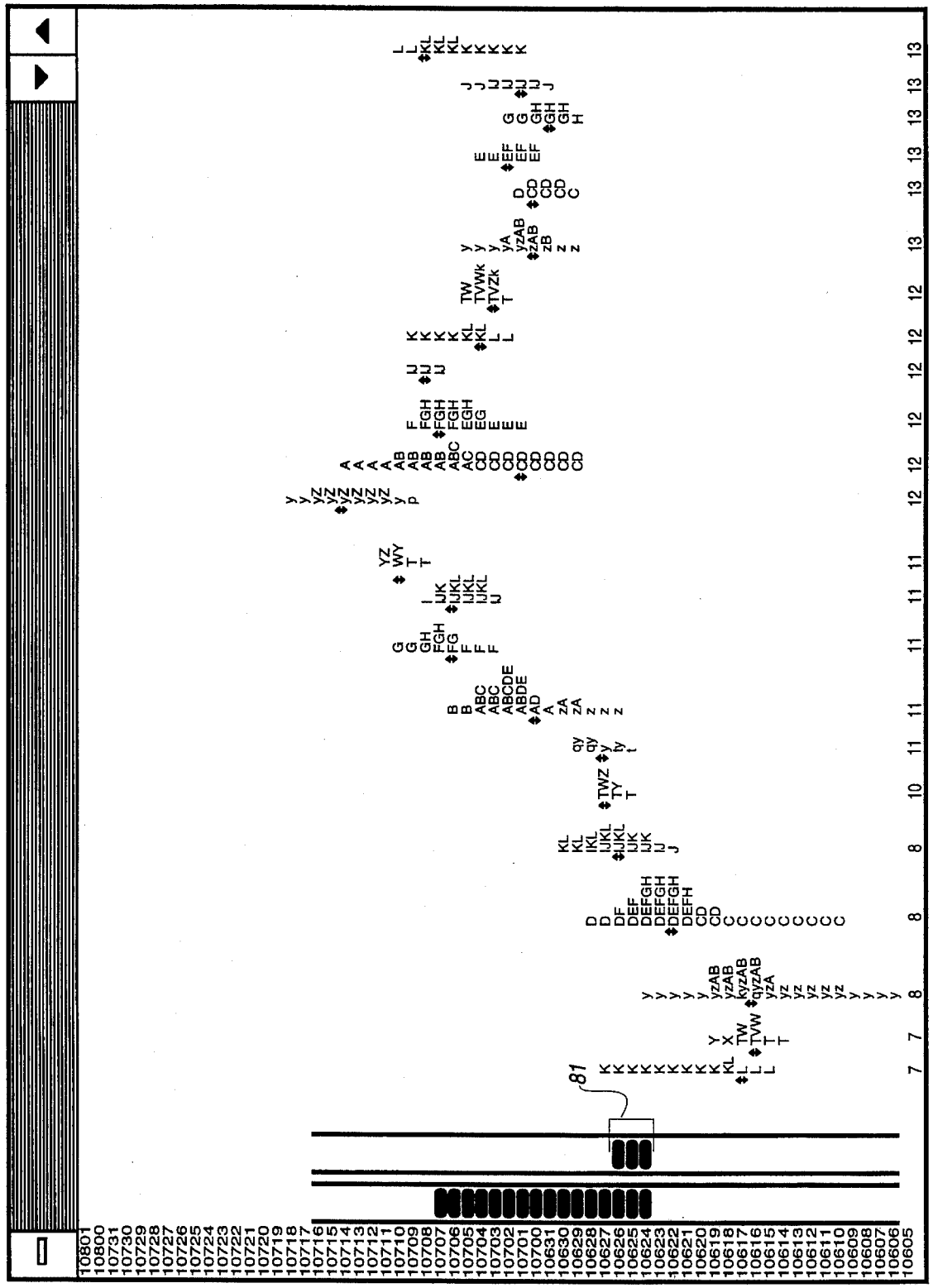
FIG. 7-C

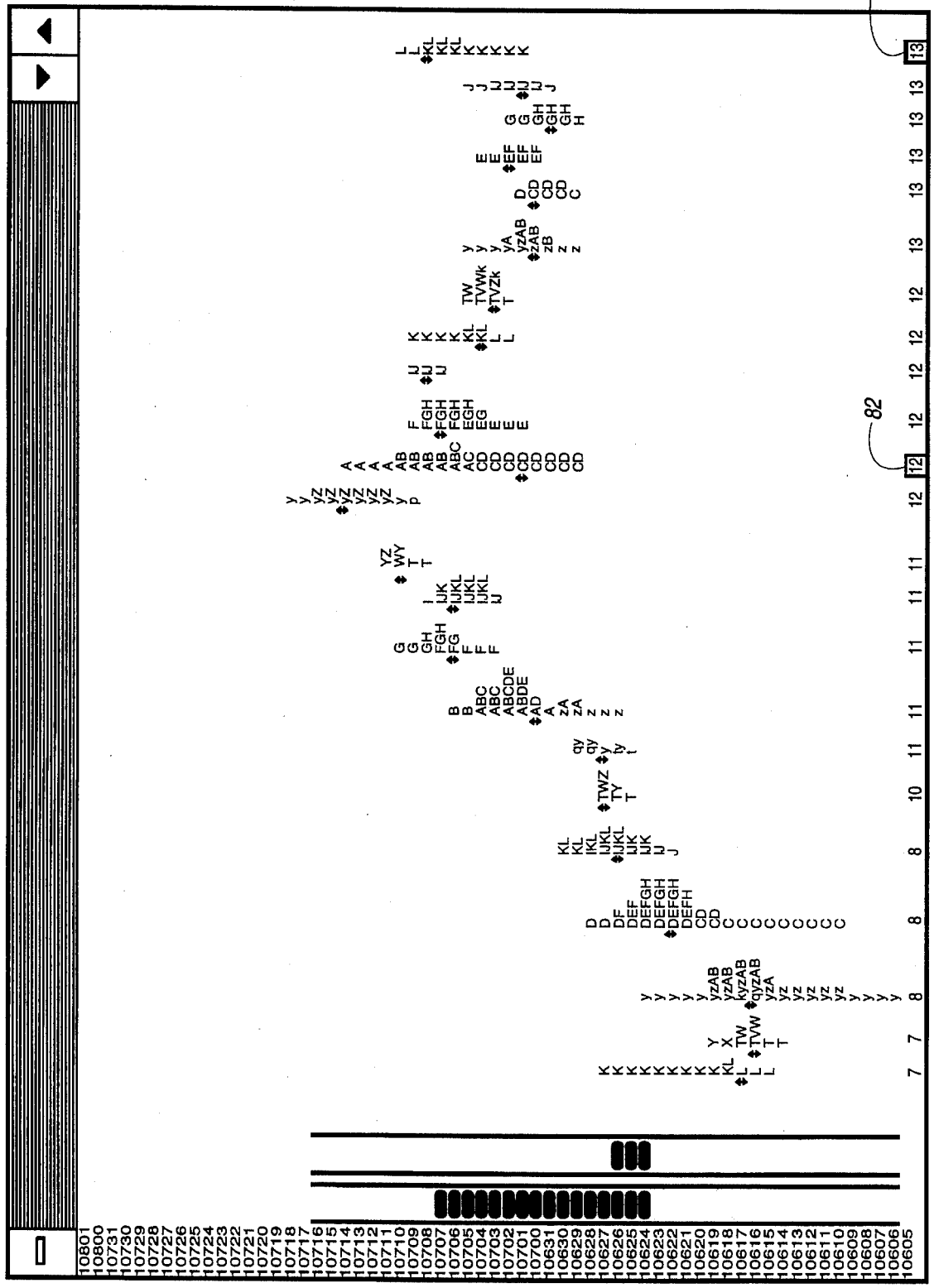
FIG. 7-D

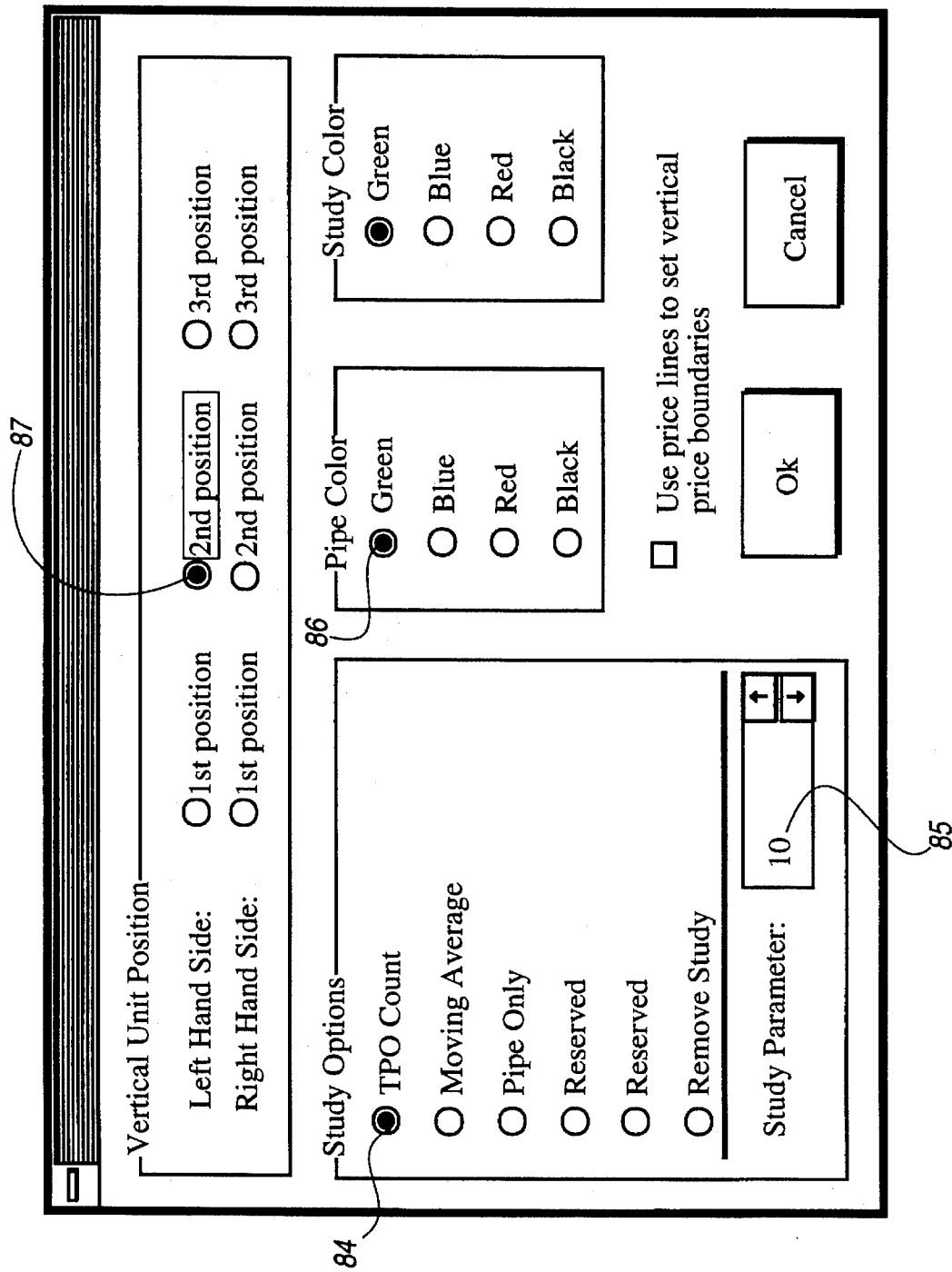
FIG. 7-E

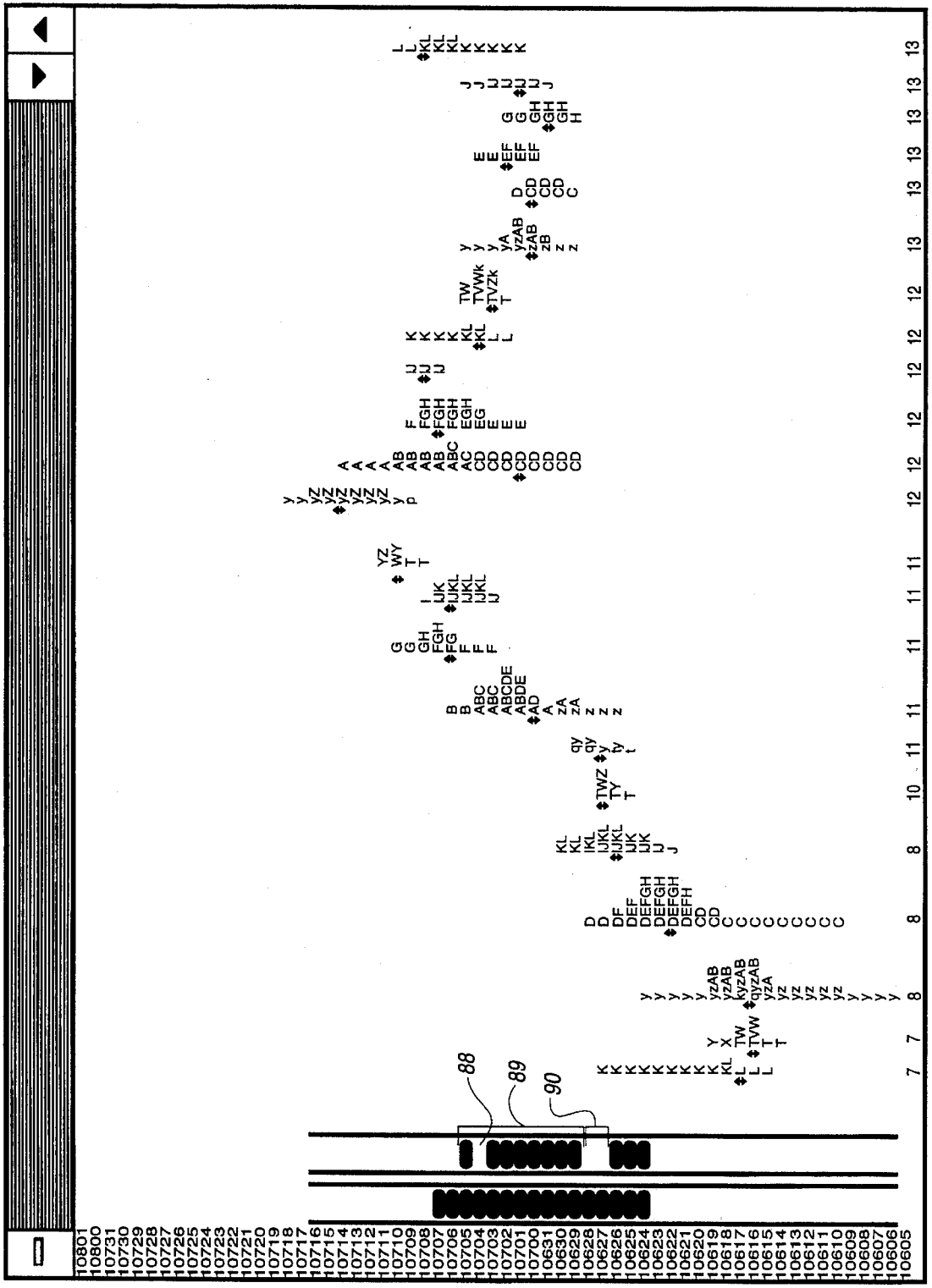
FIG. 7-F

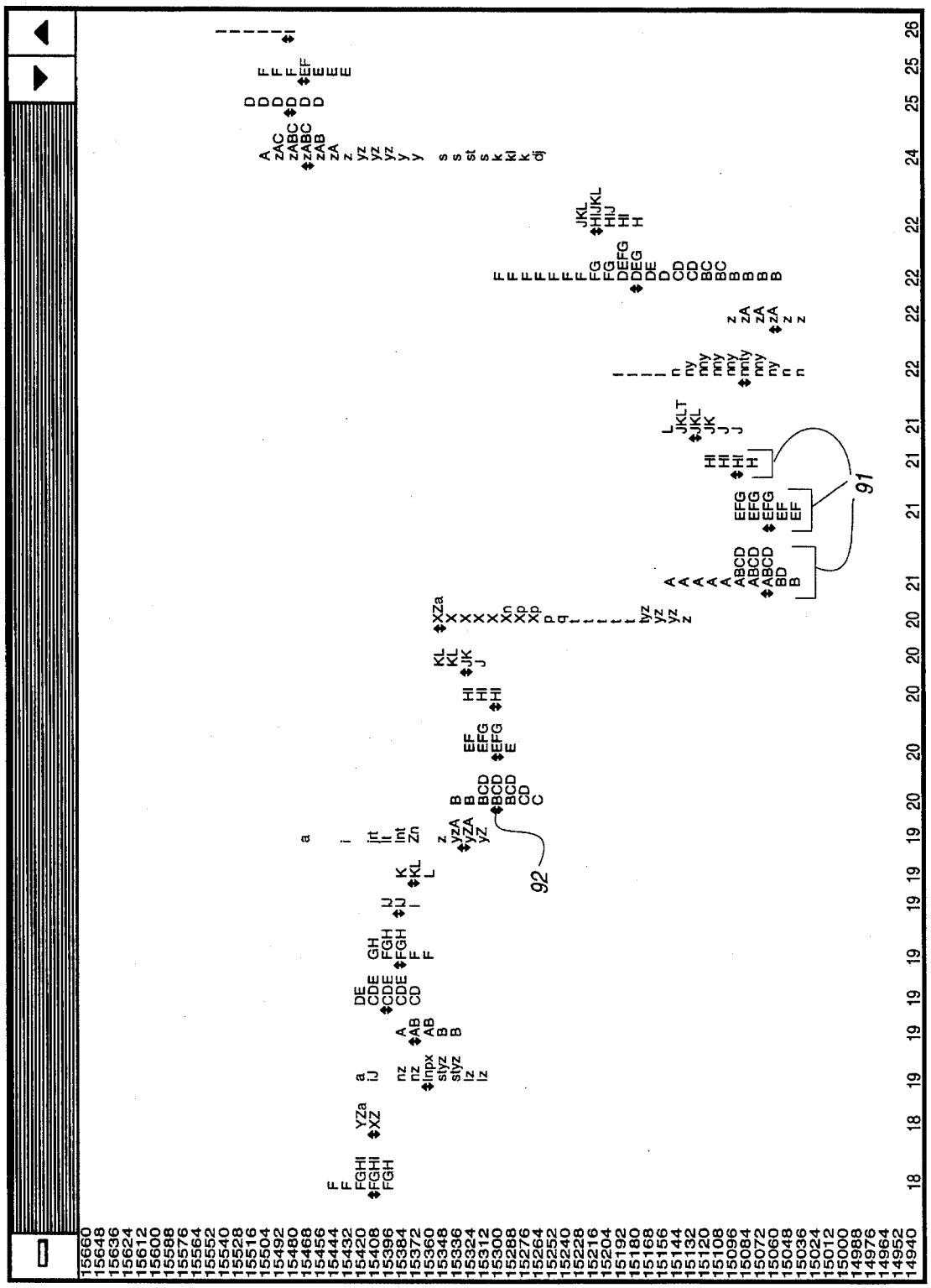
FIG. 8-A

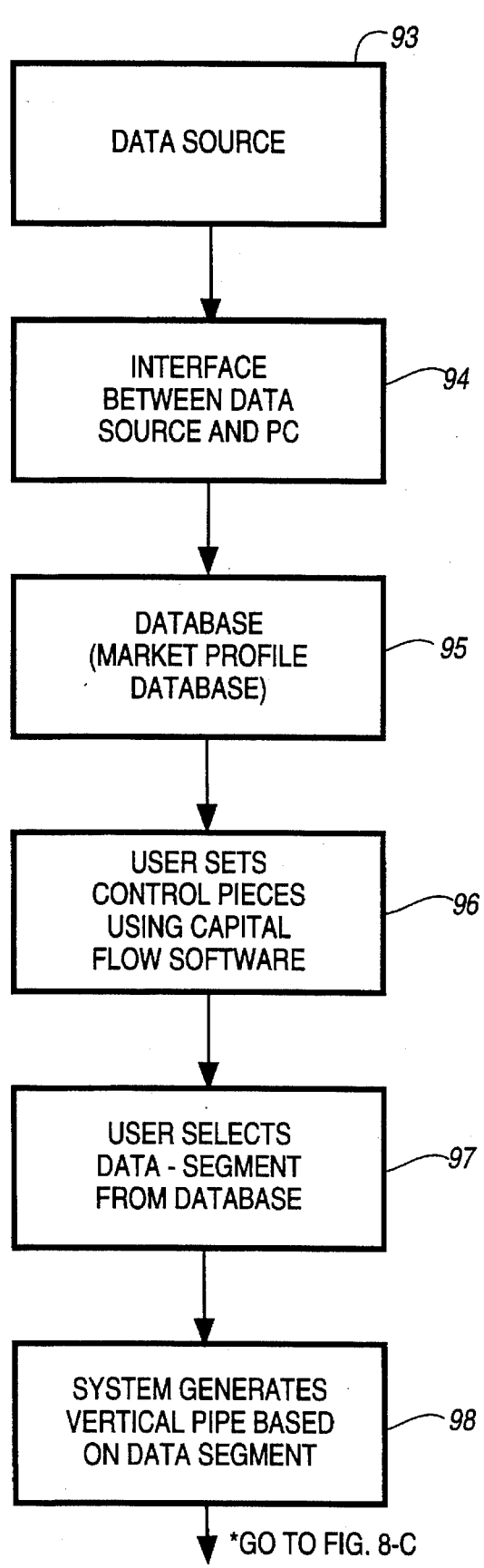
FIG. 8-B

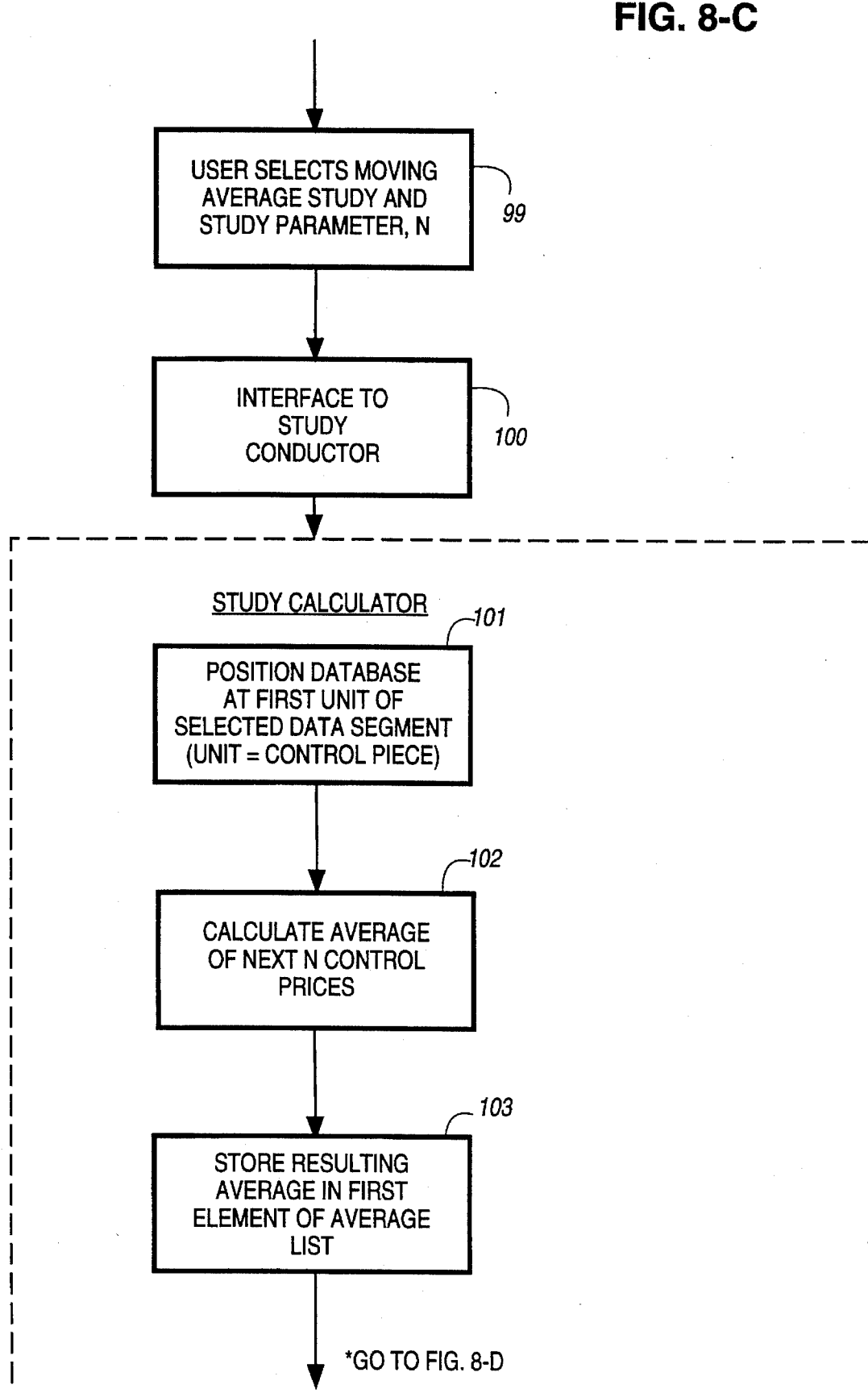
FIG. 8-C

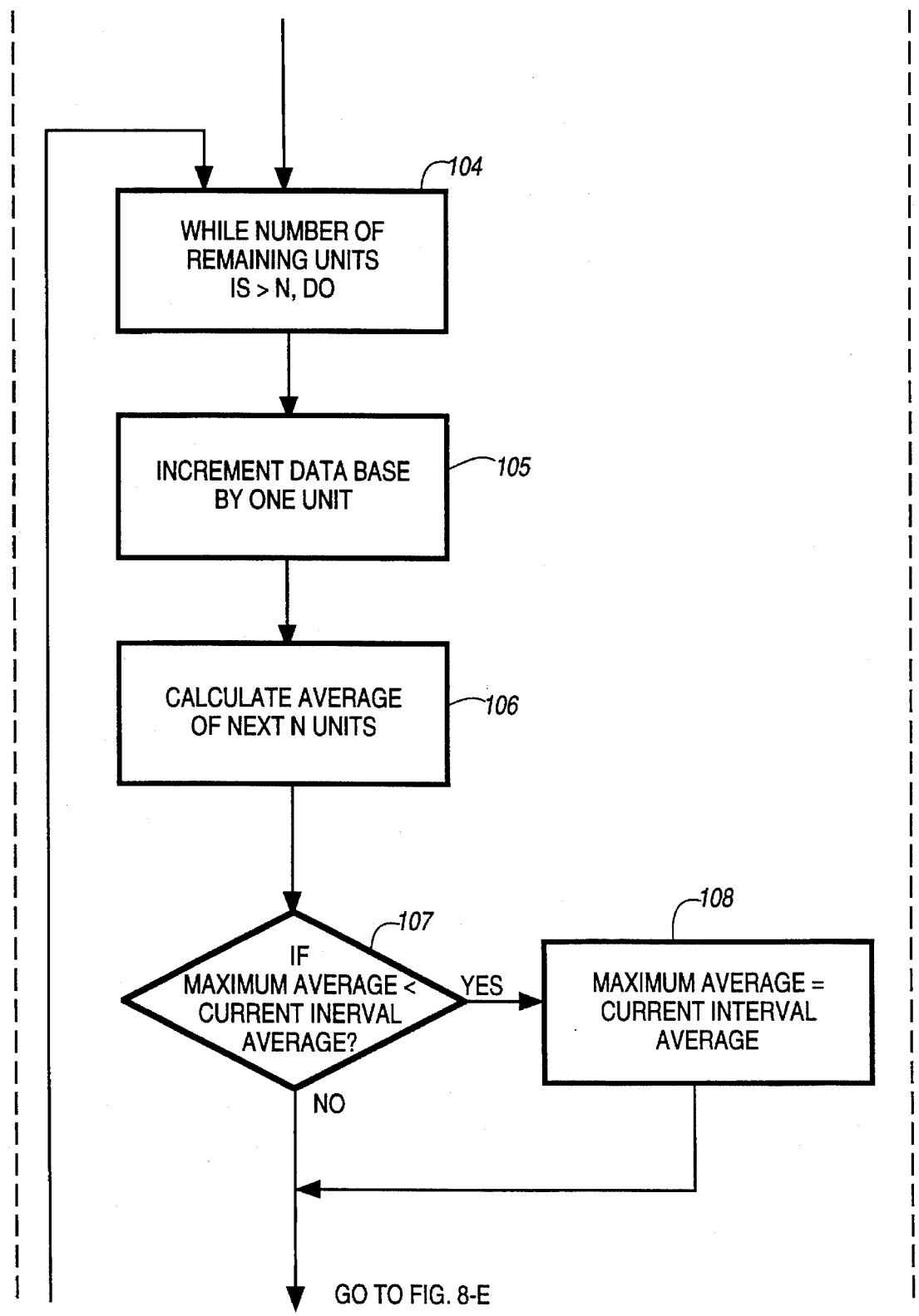
FIG. 8-D

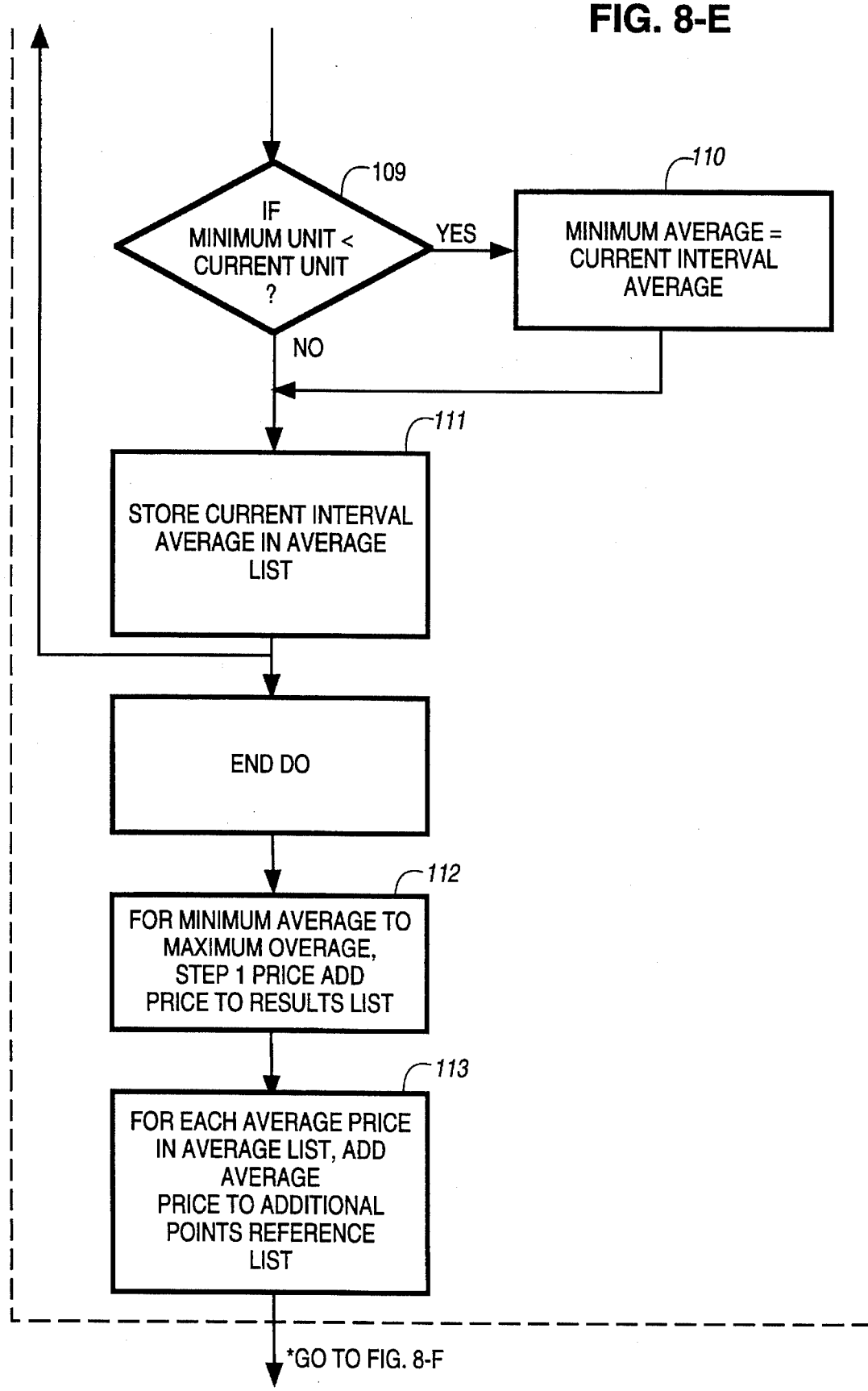
FIG. 8-E

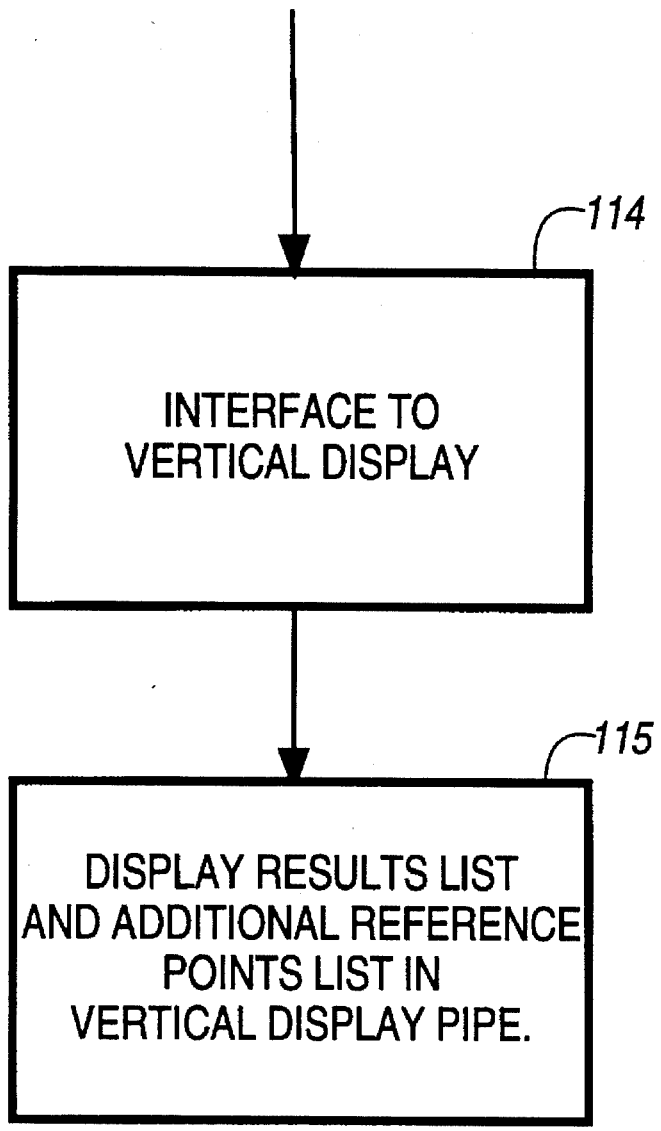
FIG. 8-F

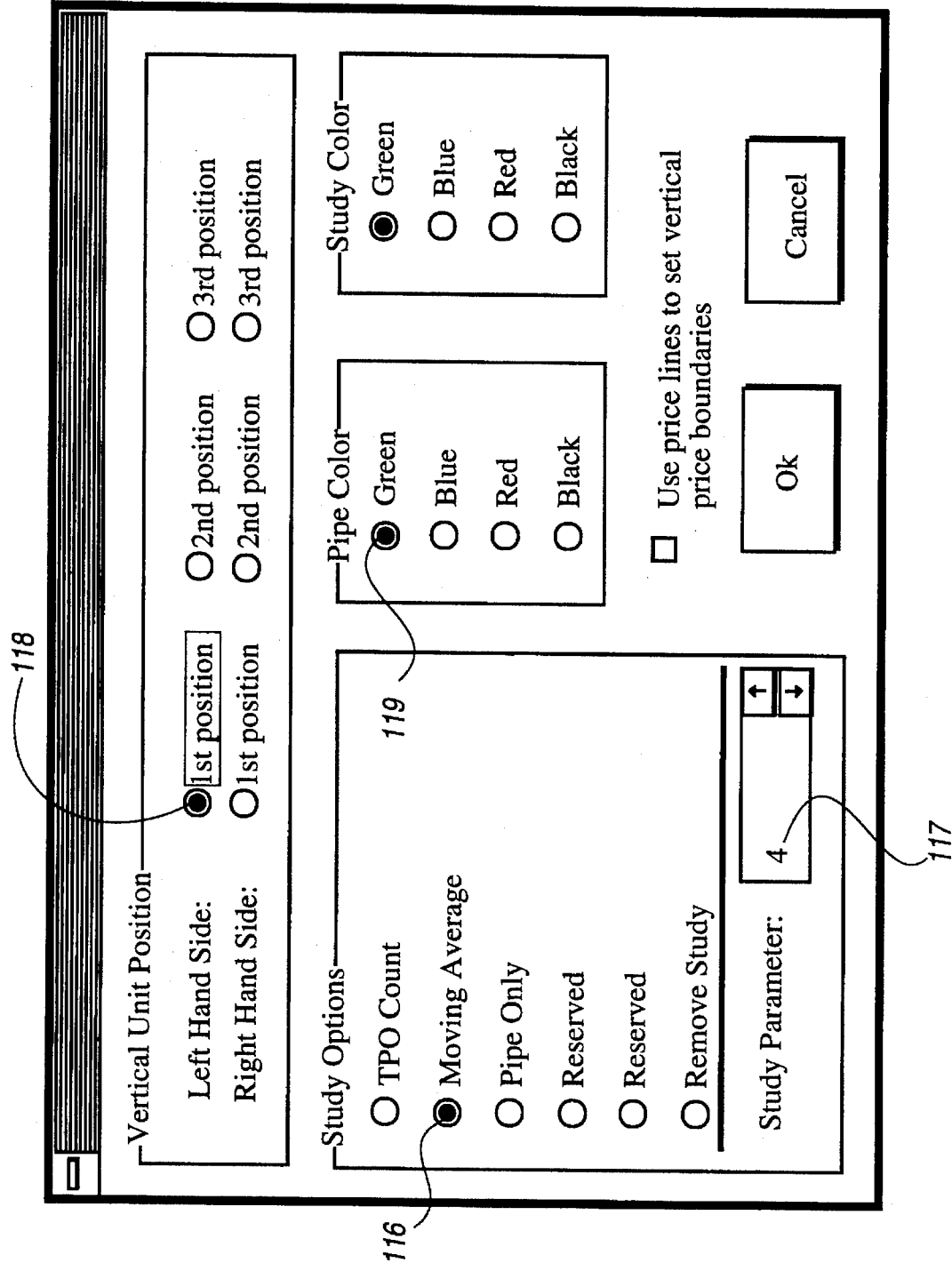
FIG. 9-A

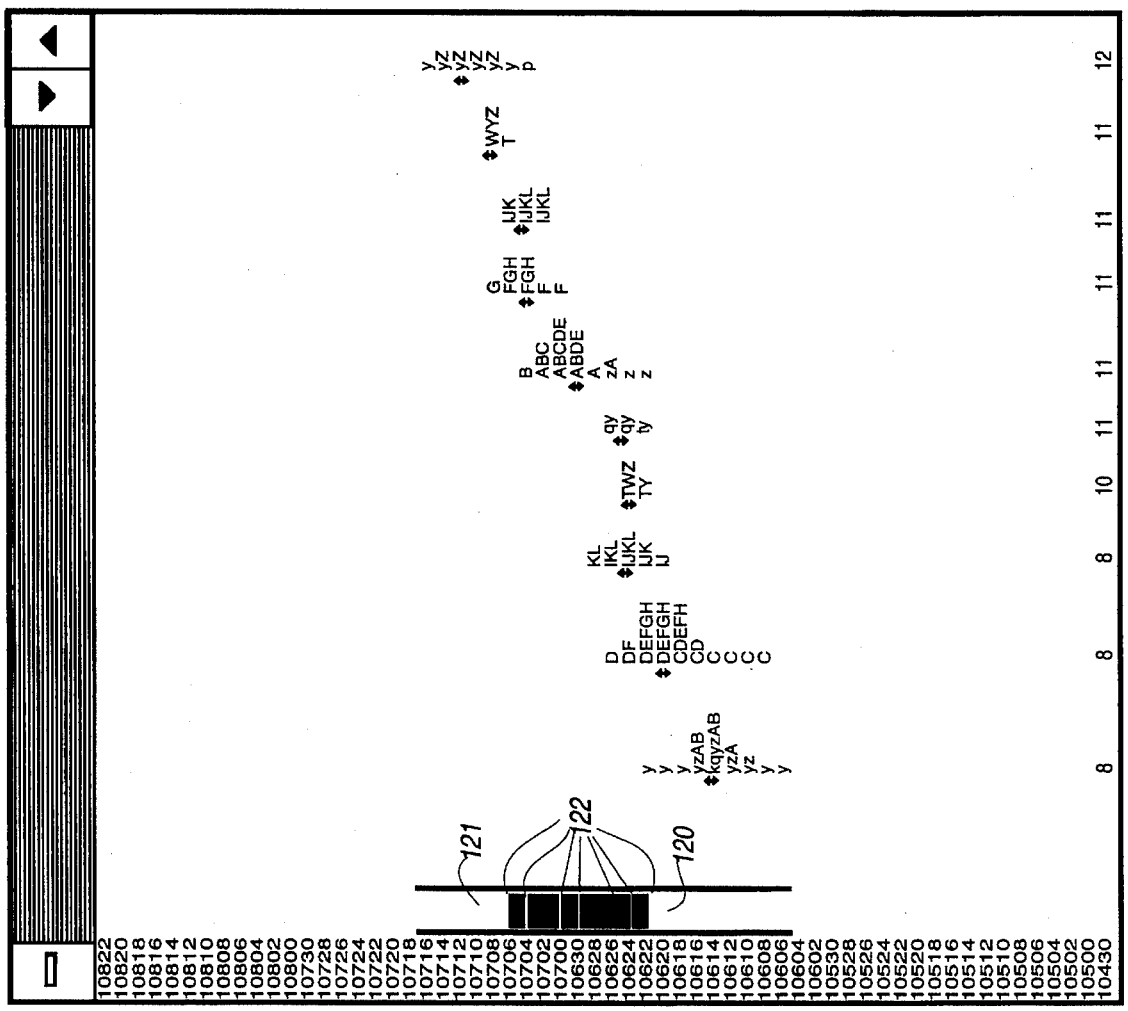
FIG. 9-B

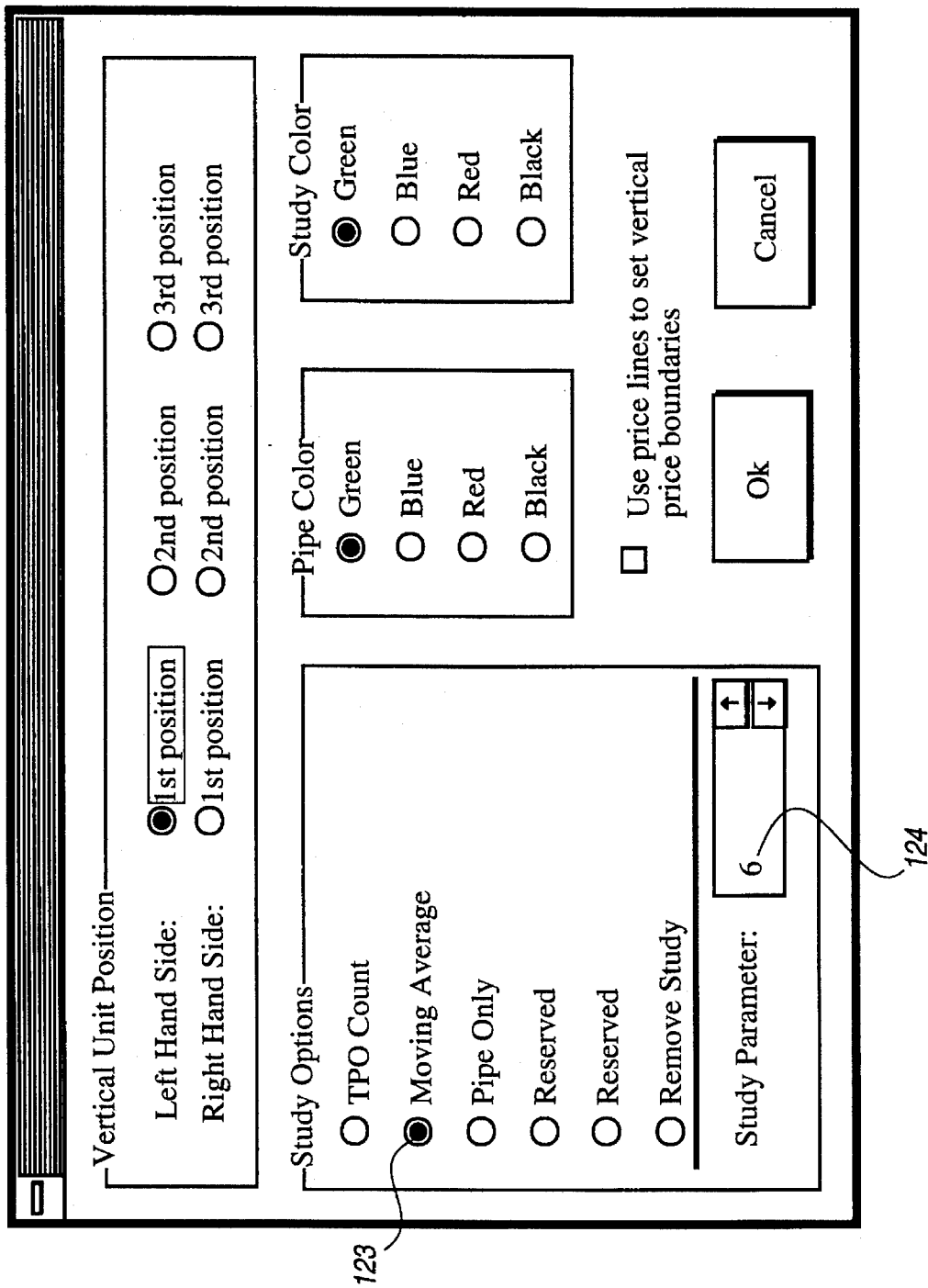

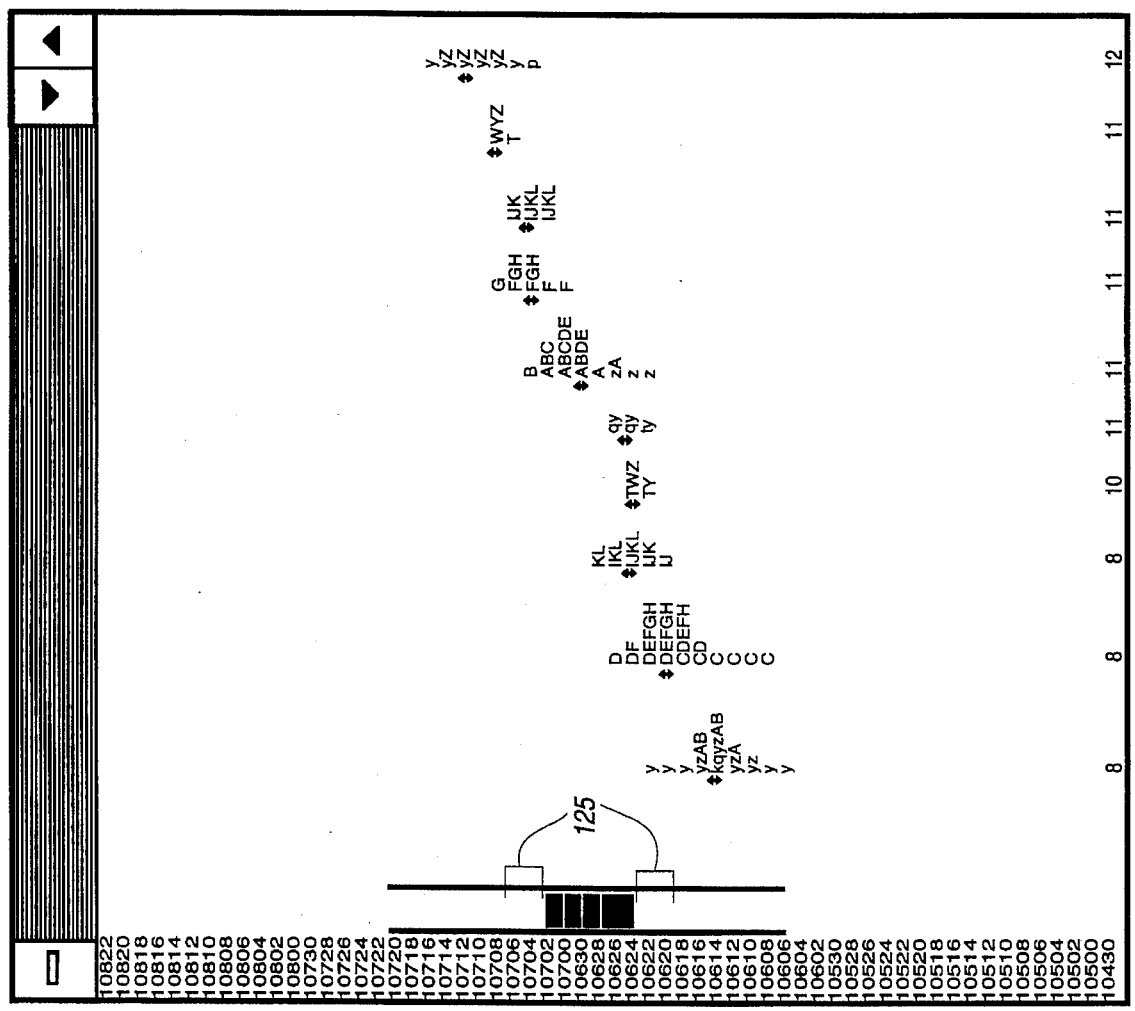
FIG. 9-D

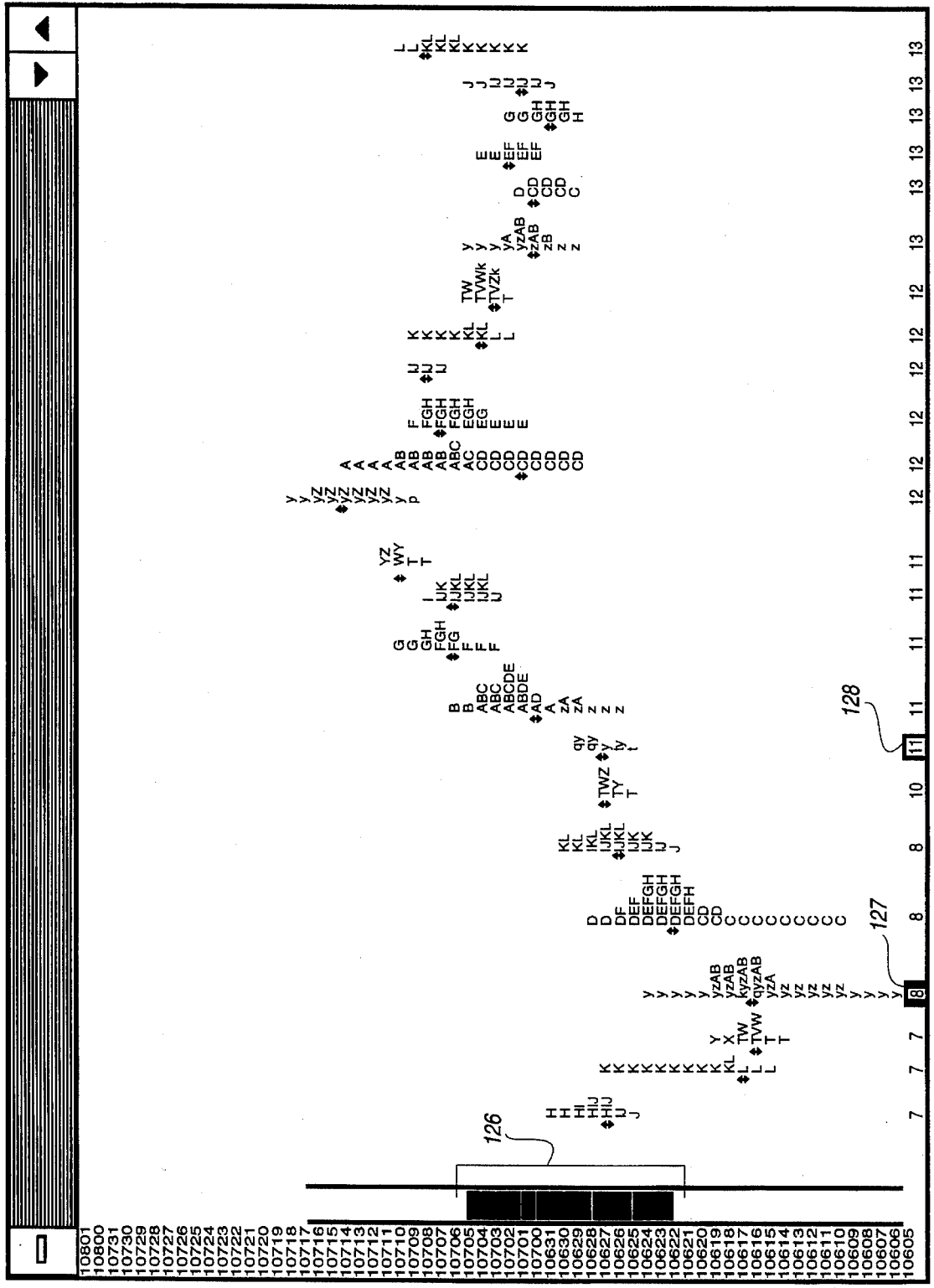

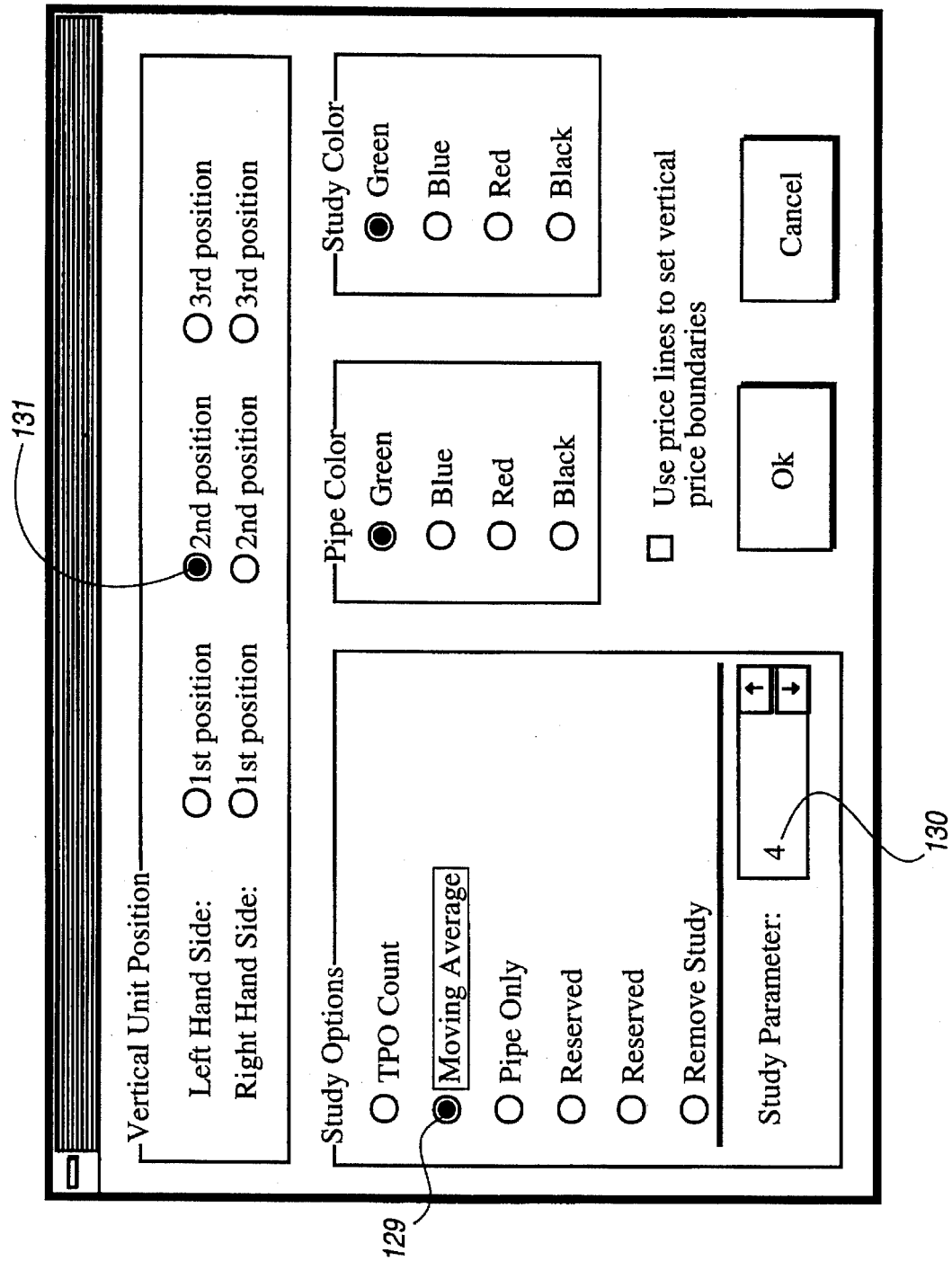
FIG. 10-B

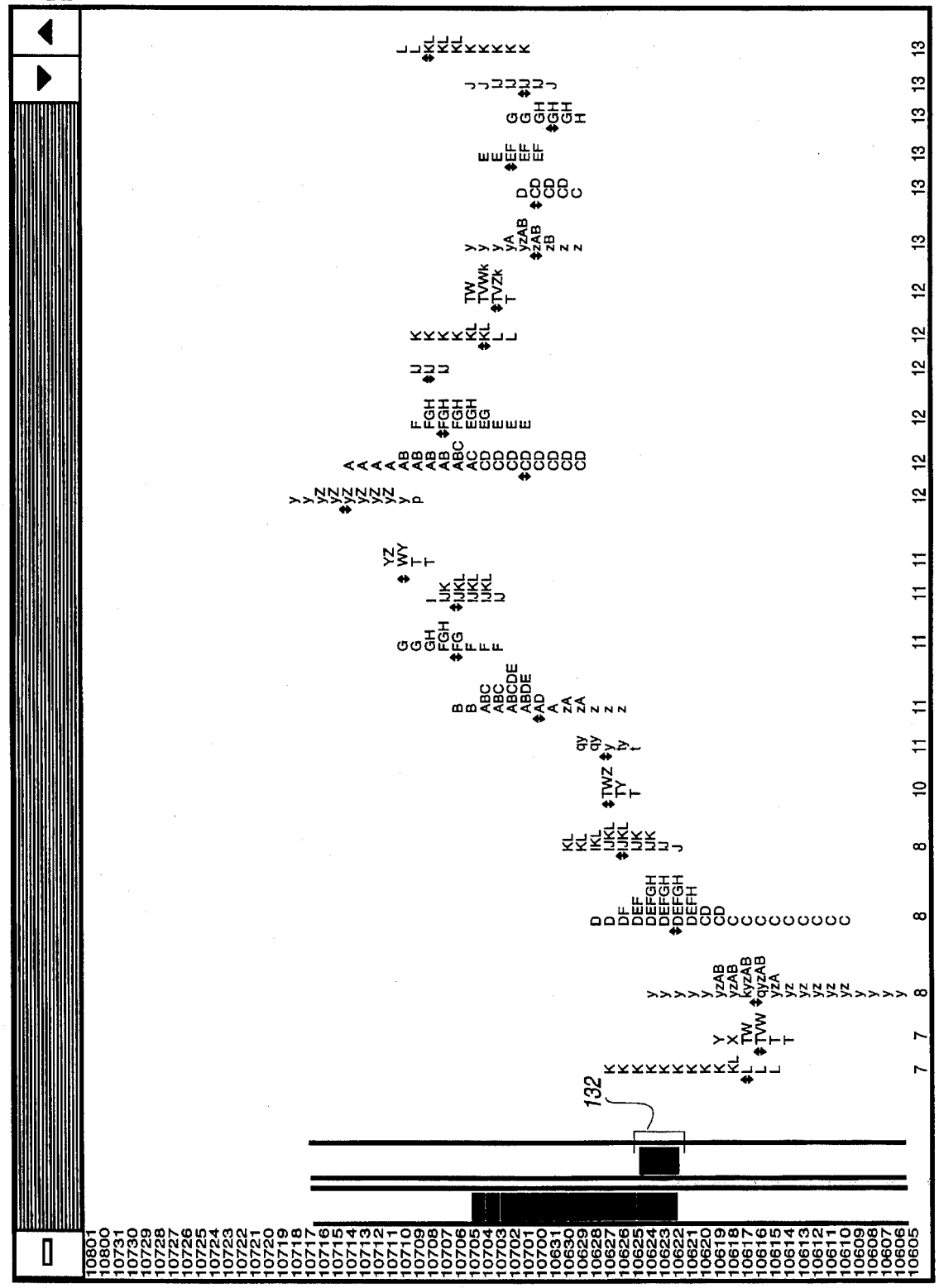
FIG. 10-C

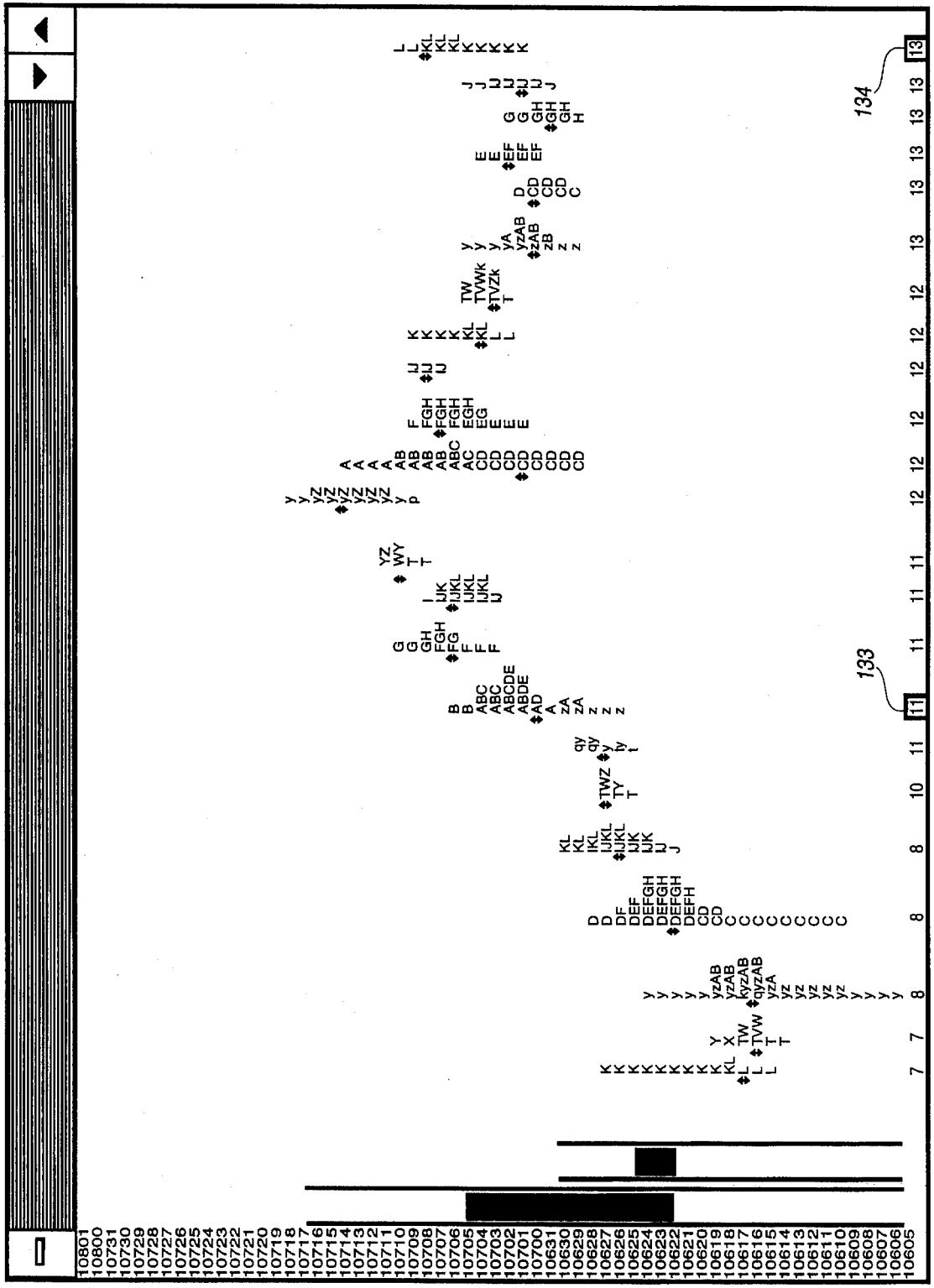
FIG. 10-D

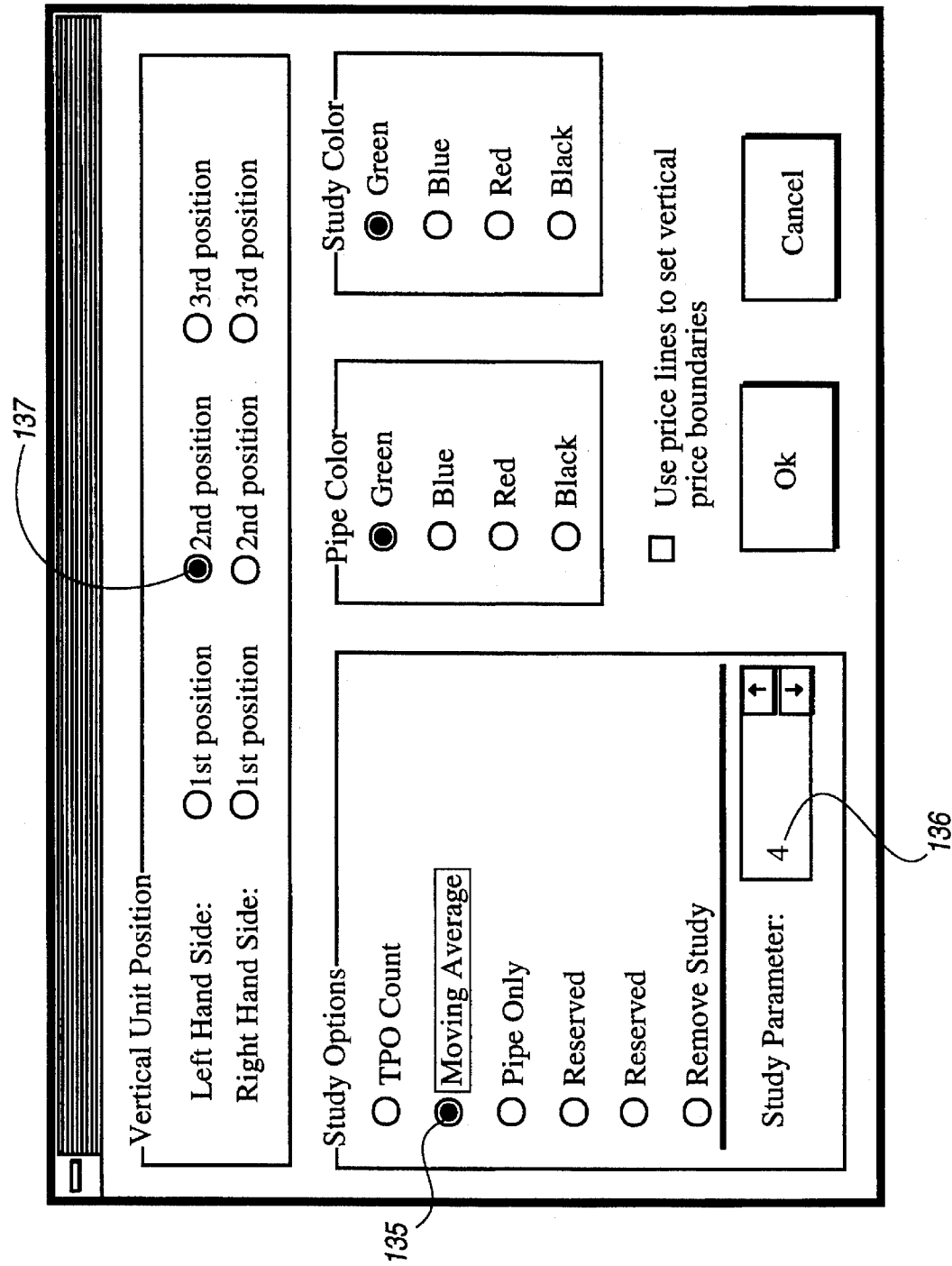
FIG. 10-E

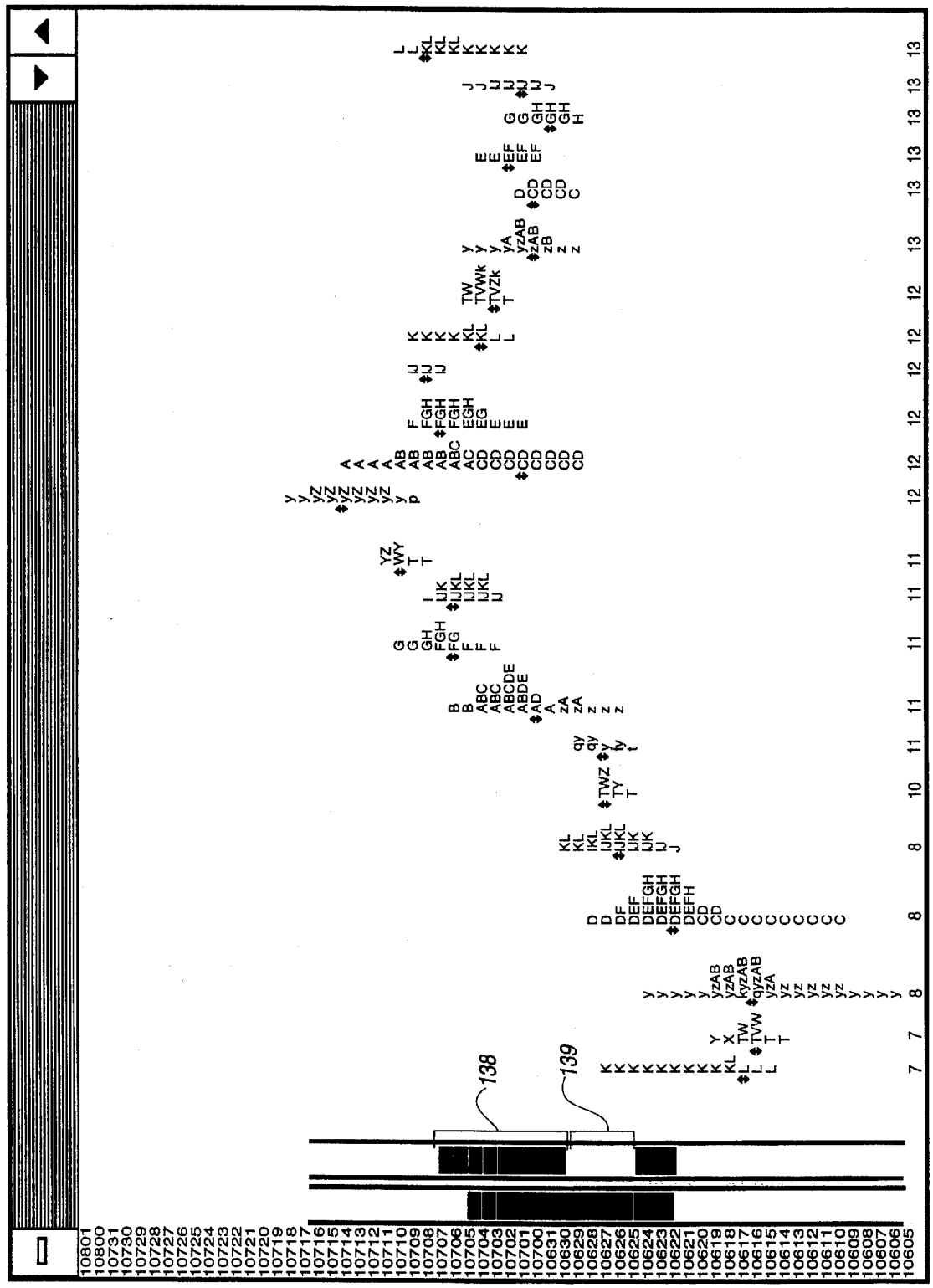
FIG. 10-F

FINANCIAL DATA EVENT FLOW ANALYSIS SYSTEM WITH STUDY CONDUCTOR DISPLAY

FIELD OF THE INVENTION

The invention relates to apparatuses and methods for controlling, summarizing, and managing a data stream, such as transaction data in a trading market for a particular commodity, and displaying that data in an immediately visible form on a single display screen. In particular, the invention relates to an interactive system whereby the user accesses data that are accumulated continuously over time, stored in a database, organized graphically, and displayed on a computer screen. The invention further conducts user-parametered studies on user-defined segments of that data, including the entire database data segment, and thereafter displays the study results in summarized, concentrated form in a vertical pipe or pipes on a single computer display screen. The user's objective is to structure data-segment parameters and study parameters so that meaningful data event changes occurring in the database are subject to user identification and control and are susceptible to display in visually perceptible vertical pipes.

BACKGROUND OF THE INVENTION

Data processing systems exist that typically format continuously accumulated data by displaying the data on a graph where the y axis shows the incremental data units of change, and the x axis shows the time at which, or other units of usage measurement with reference to which, the displayed data events occur. This format depicts the data events horizontally as a linear string of data points each of which may vary in vertical location.

An important illustration of such a continuous linear data environment is the data generated by continuous transactions in organized futures markets and securities markets. These markets generate transaction price reports steadily throughout each trading session. A common approach currently taken to displaying such transaction price data is to show transaction prices over selected time frames—on a graph where the y axis represents price and the x axis represents time. (Such displays are referred to as "price over time" displays.) Because the financial markets provide an evident example of continuously developing horizontal data that is commonly displayed graphically, this section primarily focuses on the background of the art of displaying and analyzing data in those markets. However, the term "market" is used in this application to describe any situation, series of events, or statistical environment that generates continuously developing data, i.e., data capable of linear display, and is not to be confined to the narrow meaning of financial markets.

Such use of charts, graphs and other visual displays of transaction data in financial markets is known as "technical analysis." Technical analysis has been defined as the measurement and study of patterns and movement in prices, transaction volume and open interest in given traded products. See e.g., P. Kaufman, *The New Commodity Trading System and Methods*, (1987, John Wiley & Sons, Inc.) at p.2; N. Rothstein, *The Handbook of Financial Futures*, (1984, McGraw-Hill Book Company) at p. 33. Technical analysis is commonly contrasted with "fundamental analysis" which focuses on economic, political or environmental factors pertinent to the market for a given product but external to market transaction price and volume.

Traders and market analysts who use technical analysis have devised a variety of statistical indices and approaches. Some of those indices and approaches are summarized in various widely-published reference texts, including, e.g., P. Kaufman, op. cit.; N. Rothstein, op. cit., and T. Meyers, *The Technical Analysis Course*, (1989, Probus Publ. Co.). Typical statistical charts include price-line charts, in which price levels—commonly the high, the low and the closing price levels—are charted horizontally over time, and point-and-figure charts, in which price trends and reversals in trends—commonly trends and reversals in the day's high and low prices—are charted without reference to any particular time intervals. Certain statistical summation or analysis techniques, such as charting moving average prices, calculating the momentum of price changes, and perceiving price movement patterns, are also in common use on those existing databases.

The development of computer systems and software supportive of technical analysis has enabled technical analysts to use statistical discipline more efficiently. Many systems and programs feature the capability to perform some study operations on raw or configured transaction price information. Such studies are more meaningful than raw data because they reveal developments in market prices or trends over time.

For example, Roberts-Slade, Inc. markets a technical analysis package called "FirstAlert" that enables users to conduct studies on continuous data segments. Other technical analysis packages with similar functionality include "RealTick III" by Townsend Analytics, and "Master Chartist", also by Roberts-Slade, Inc. The utility of these systems is limited in four ways, however. First, the user commonly is able to view study results only in reference to a single limited data segment displayed on a single screen or in a single window on a single screen and therefore cannot efficiently gain perspective regarding data development over many time flames. To analyze many time flames, the user has to access numerous screens and cannot compare the variety of study results in a concentrated, summary form on a single screen. Second, existing systems make allowance only for studies the results of which focus on pre-set time segments. That is, existing systems configure data and provide study capabilities in relation to streams of data organized in hourly, daily, weekly or monthly segments. Such systems, unlike the Invention, do not enable the user to configure and summarize data without reference to pre-set time segments. Third, existing systems provide only for continuous studies, from which it is very difficult to discern transaction flow beginnings and endings within the subject database. Fourth, no existing system provides a capability to study data streams so as to identify basic data-event changes and display them in a simplified, uniformly-formatted visual summary on a single screen.

This Invention overcomes those infirmities. Prior to this Invention, Steidlmayer and Kummel developed software called Capital Flow Software, which provides the user with a flexible base of continuously accumulated linear data. The database and display approach incorporated in Capital Flow Software differs from that of other existing systems in that it uses specialized analytical tools to assess the progress of market activity over time. In his most recent book *New Market Discoveries* (1990, KIRBMARN), Steidlmayer set forth his basic view that market activity is "regulated" by a market-dependent product distribution/capital distribution mechanism. He stated that a "working knowledge of the distribution process is key" to understanding how a market works and how prices move over time and said that distribution "is a series of prices moving in one direction to correct an economic imbalance (supply/demand) in the marketplace." In effect, price governs the distribution and its extent—i.e., its range in price and time. As price moves, it affects market activity by slowing down and eventually "stopping" a distribution of product. Thus, price eventually stabilizes a distribution so that development can begin.

Steidlmayer continues:

A natural spectrum exists [in every market] which depicts the range of overall price control. Non-price control, excessive supply or demand, holds one extreme, while price control, regulated supply and demand, occupies the other. Non-price control creates an atmosphere of uninhibited [dispersion of] product demand or supply, which results in a large distribution. In contrast, a smaller, more contained distribution evolves from a price control situation. Eventually, a price that contains both supply and demand will emerge from within [any] distribution, limiting the market to its original range . . . .

It is difficult for markets to grow and be efficient simultaneously—rather the market accomplishes these two processes [—growth and efficiency—] in a series of stages . . . . The first stage consists of the distribution itself and the emergent price which stops and holds it. The second stage concerns the development of the distribution as it relates to the influence of price. This controlling price can be located at the top, mid-point, or bottom of the distribution . . . . Once the market completes its growth phase and becomes static, a third and final stage occurs which makes the market the most efficient. A price that best serves all participants is located and utilized. Essentially, the market is heavily influenced by the first two stages, while the third stage exerts a latent influence through time . . . .

The movement of the market is [thus] a two-step process comprised of distributions and their subsequent development. In this process, the development of the distribution provides a time buffer or lull, much like a traffic signal changing from green to red with yellow as an interim warning signal, or a transition between the two. In the market, this time buffer is comprised of the three standard deviations; the most important of which is the first, as it defines the area of price control in the distribution.

Steidlmayer's approach to market analysis underscores the impossibility of determining the beginning, ending, and development points in a distribution if one refers only to a one-day time frame or a particular intra-day price. Distributions and their development occur over "natural" time frames—sometimes minutes, sometimes many days. A market is "in development" and a distribution flow is beginning to end when the transaction price begins to be controlled, i.e., when market activity begins to be centered around a control price.

The Steidlmayer market analysis approach is embedded in the "Capital Flow Software," which is currently licensed to traders. Like other software programs, the Capital Flow programs use a price/time "graph-format" screen; but unlike other software, the Capital Flow programs can be used to organize and depict market data in configurations that evidence genuine distribution and distribution development over non-arbitrarily segmented time. As with other systems, the data enters the Capital Flow Software program from a data stream feed; Capital Flow Software, however, enables users to organize received data into event segments that are not defined by pre-set units of time. Thus, through use of the Capital Flow Software, licensees can "customize" a horizontally-displayed database. This ability to configure the data flow in a customized way allows the data to be organized and displayed with reference to the inherent divisions or dislocations in the flow of data events.

Key to understanding or acting on data segment analysis—as reflected in the advance made by the Invention—however, is not simply the ability to configure data clusters in various ways, but, instead, the ability to identify those periods in a data stream when the market is in "minus development", i.e., when transaction prices dislocate from the control price of a preceding development, thereby becoming disconnected in price and range of price from the immediately past transaction activity. This dislocation is triggered by a change in the flow of capital—either in or out of the market. Identification of minus development provides an important key to understanding price movement (or, more generally, data progressions) because it illustrates points of change in the underlying events recorded by the data, thereby providing information about transaction requirements or opportunities (or, more generally, information about key dislocations in data event flows).

In sum, existing technical analysis systems, including Steidlmayer's own Capital Flow Software, allow users to organize and, in some ways, analyze continuous data streams. In each of these systems, however, the user can only evaluate the limited quantity of data located on a single screen. That limitation restricts the user's ability to gain a full perspective on developments in the market. The Invention, as described more fully below, therefore serves the currently unmet need to provide market analysts and transactors with the capability to model, define, control and manage a linear stream of data of any length through reduction to a simplified visible summary displayed on a single screen, which display is uniform in format for all data streams studied and for all types of data stream studies.

OBJECT OF THE INVENTION

It is therefore an object of this Invention to provide a System which will enable a user to model, define, manage, and control continuous linear data configured graphically, by providing the System user with means to conduct studies and observe the results thereof on an unlimited number or range of user-defined data segments. This objective of the invention is accomplished through the System's display of study results in a concentrated fashion in a vertical pipe on a single screen. The vertical pipe display format necessarily means that study results are not dependent on fixed units of time (e.g., daily, monthly, etc.) or other usage measurement units. Study results may be printed in hard copy by use of an attached printer.

It is also an object of the invention to provide a System which provides users with the capability to configure study parameters so that the vertical pipes reveal space or a different color segment within a study result or between study results. Such space or color segments represent the state of minus development in the data segment(s) studied. The display of minus development signifies dislocation in the stream of data events. The Invention thus provides a significant means to identify key changes in data event flows by enabling a user to expand and collapse study parameters until the user locates, and the system displays, minus development with as much precision as desired.

SUMMARY OF THE INVENTION

The present invention comprises a data stream input device for transmitting to the System a continuous stream of data, e.g., a telephone line, plus interface means operative between the input device and a personal computer or other stand-alone device. The present invention also provides software means and user-input instructional means, such as a hand-held mouse, for receipt, storage, configuration and display of the continuously developing, graphically-organized data.

The present invention also comprises software means and instructional user input means, such as a hand-held mouse, through which the user can select a specific segment of data, a particular study to be performed on that data, and the data analysis parameters for the chosen study, as well as the color and screen position for the vertical pipe that will contain the study results, and the color for the study result itself. The System responds to user input by constructing a vertical pipe capable of receiving and containing the study results. The System further provides interface means between the database and a study conductor in the software where studies are performed responsive to user input. Following completion of the study, the results are communicated to a results drafting means in the System, which maps the results into the interior of the vertical pipe. Through the use of screen display means, and hard copy prints if so desired, the user can see the study results in vertical pipe(s). The System further allows a user to update current studies either periodically or, in the case of certain current studies, continuously, as new data enters the System. In addition, the System enables a user to conduct and display additional studies—either adjacent to each other in special vertical pipes or vertically stacked in a single pipe—by repeating the entire study setup process.

The vertical display of study results necessarily eliminates the horizontal axis typically used in technical analysis graphs, thereby disassociating the results displayed from fixed units of time or other usage measurement units. The study results displayed vertically thus provide readily visible information to the user regarding dislocation or "minus development" in the market, which is evident visually on the System screen as space or as a discrete color segment in the vertical pipes—either within a study result or between study results. Accordingly, the System enables a user to configure data-segment parameters and/or study parameters so as to define dislocations in the flow of data events with as much precision as desired and then to display that dislocation in the vertical pipes. Having thus identified and defined a dislocation in the data base, the user can draw analytical conclusions or make transactional decisions with refinement. The specific nature of the conclusions to be drawn or the decisions to be made would vary depending on the specific type of data event streams under analysis. In the futures contract trading context, for example, the current market transaction price for a particular commodity ordinarily will either be above or below the most recent price data dislocation, signaling—absent subsequent dislocations—trading opportunities that are discretely separated from the range of transaction prices occurring prior to the data event dislocation and that remain so separated until market price retraces, as it commonly does, to the point of dislocation. A System user thus can observe current price movements and the current unfolding of distributions and developments with reference to well-defined price events and can make decisions about price movements and transaction opportunities based on those observations. In other contexts, dislocations will convey different, data-context-specific information about the data flow.

Other objects and advantages of the invention will become apparent upon reading the following detailed description and upon reference to the drawings.

BRIEF DESCRIPTION OF THE DRAWINGS

The present invention will be further described in the following portions of this specification when taken in conjunction with the attached drawings in which:

FIG. 1-A-C is a System Overview that sets forth all of the steps involved in the use of the System.

FIG. 3-A-E is a Schematic Diagram setting forth the method steps for generating the boundary lines for the vertical display pipes in which study results are displayed.

FIG. 5-A-E is a Schematic Diagram setting forth an embodiment of the System that incorporates a Time-Price Opportunity Study.

FIG. 6-A-G is a series of screen displays depicting a user session with the System embodiment shown in FIG. 5.

FIG. 7-A-F is a series of screen displays depicting a second user session with the System embodiment shown in FIG. 5.

FIG. 8-A-F is a Schematic Diagram setting forth an embodiment of the System that incorporates a Moving Average Study.

FIG. 9-A-D is a series of screen displays depicting a user session with the System embodiment shown in FIG. 8.

FIG. 10-A-F is a series of screen displays depicting a second user session with the System embodiment shown in FIG. 8.

DETAILED DESCRIPTION

Figure 2:
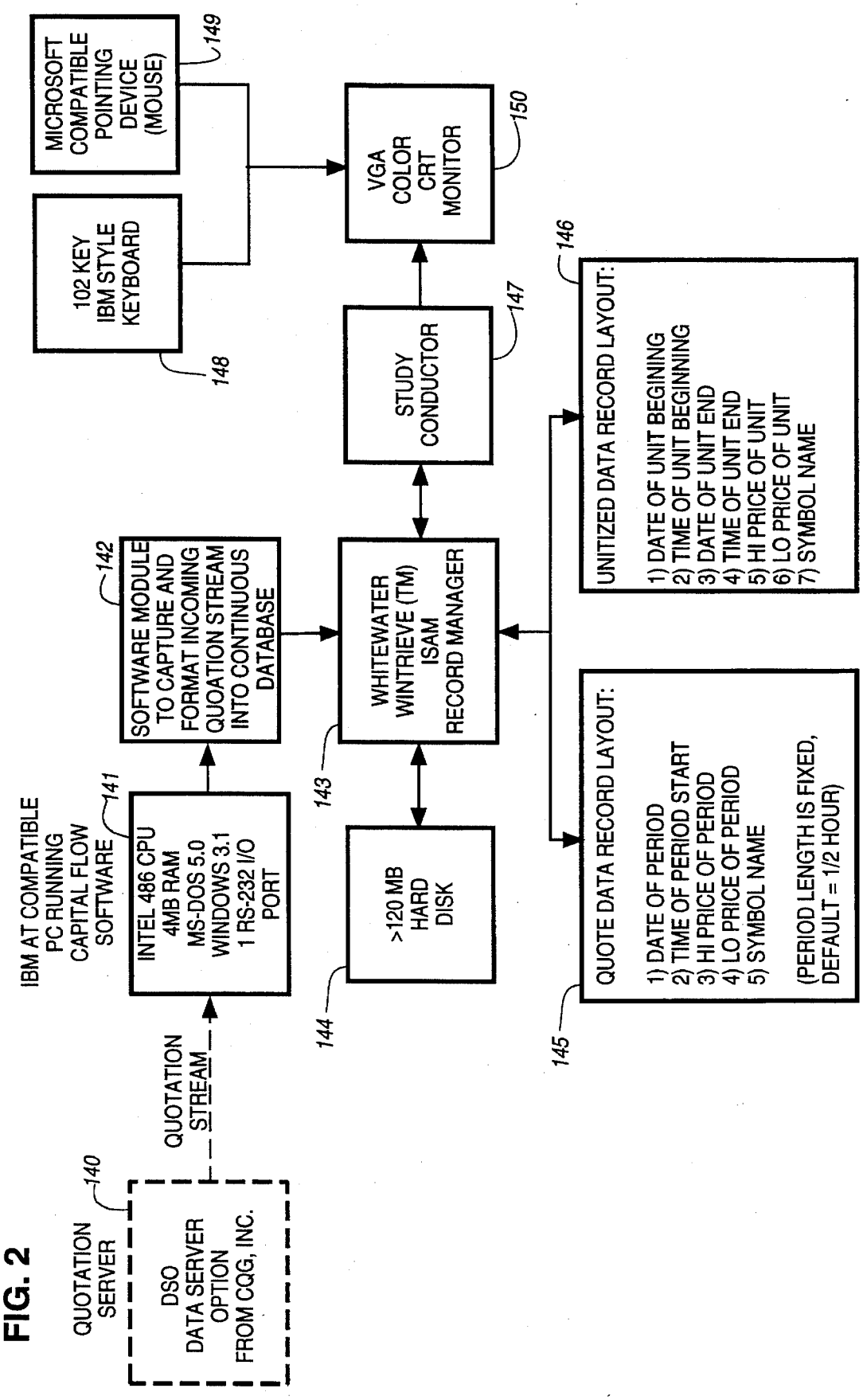
FIG. 2 is a Dataflow Diagram that shows the devices used for receiving, configuring, storing, accessing, manipulating and communicating data in the System.

While the invention will be described in connection with preferred embodiments, it will be understood that it is not intended to limit the invention to these embodiments. On the contrary, it is intended to cover all alternatives, modifications and equivalents as may be included within the spirit and scope of the invention as defined by the appended claims.

The System Overview of the present invention (the "System") is shown in FIG. 1. As shown in FIG. 1, Step 1 of the System is the construction of a database for continuously developing data, such as exchange floor transaction prices. The data is supplied by a data source 1, such as satellite, phone line or FM Radio RCVR interfaced to transaction price information vendors. A software module interface 2 facilitates communication of the data from the data source to a PC or other stand-alone device. The data is then configured and stored in a database 3 that tracks both the linear position and the magnitude of each data event unit. As is known to those skilled in the art of computer systems, these three functions—receipt, configuration and storage—can be performed by a single module or by separate modules.

Step 2 of the System enables a user to select a segment 4 of linear data from the database to be studied by using an input device 5 such as a keyboard or mouse. The selected data segment can be viewed on the display screen 6. The user then selects the type of study 7 to apply to this data segment as well as the study parameter for this study. Again, these selections are made via an input device 5 and can be displayed on the display screen 6.

As further indicated by FIG. 1, Step 3 of the System is the generation of the boundary lines for the Vertical Pipe 8 in which study result(s) are to be displayed. The System determines the range of magnitude of data-event units in the user-selected data segment, and draws two vertical bounding lines that encompass the entire range.

Step 4 of the System involves the application of the user-directed study on the user-selected data segment with the user-selected parameter 9. The user-selected data segment, study type and study parameter interface with a study conductor 10 in a way that causes the user-directed study to be applied by the study calculator 11. Any type of study can be used, provided that such study has a single parameter or reference point that can be adjusted up or down by the user as an analytical threshold.

Step 5 reflects a departure from existing systems for controlling and managing large quantities of linear data. The study results are not displayed with reference to their linear sequence or position; rather, the results are displayed vertically inside the Vertical Pipe 12, and can be viewed by the user via a single display screen 6. The use of a vertical display necessarily eliminates the horizontal axis typically used in technical analysis graphs, thereby disassociating the results displayed from fixed units of time or other usage measurement units.

The novelty of the System is further reflected in Step 6 in FIG. 1 wherein the user analyzes the study results in the Vertical Pipe on the display screen 13. The study results displayed vertically provide the user with readily visible information regarding the presence or absence of dislocations or data locations lacking data development responsive to the study parameter ("points of minus development") in the linear data stream. Minus development is depicted visually on the display screen 6 as space or as a discrete color segment in the vertical pipe. With certain studies, it is possible for the user to identify minus development in the data flow within a single study result contained in a single vertical pipe. In other studies, minus development is apparent in the form of a separation, by space or by color, between study results.

As set forth in FIG. 1, Step 7 recognizes the utility in permitting the user to refine his analysis in order to obtain his objective—the identification and display of minus development 13. Using the instructional input device 5 multiple times in consecutive succession, the user engages in an iterative process with the System whereby the System conducts multiple studies—each with a different combination of user-selected data segments, types of studies, and/or study parameters. The System displays the results of each successive study in the same or in a different vertical pipe on a single display screen, enabling the user to look for and then see, on a display 6, points of minus development in the data flow. The user's objective is to manipulate the data-segment and study parameters until he or she is able to ascertain dislocations in the flow of data events with the degree of precision desired.

Once minus development or dislocation in a flow of data events has been identified by the user with the desired degree of precision, the user has information on which to draw conclusions or make decisions. The specific nature of the decisions to be made or the conclusions to be drawn would vary with the type of data event stream under analysis. In the futures contract trading context, for example, current transaction price will ordinarily be either above or below the identified dislocation. Through use of the System, the user can observe current price movements and the unfolding of price movements, distributions and developments with reference to the identified dislocations, including subsequent dislocations; the user can then make decisions about price movements and transaction prices based on those observations. In other contexts, dislocations will convey different, data-context-specific information about the data flow.

FIG. 2 is a Dataflow Diagram that shows the path data follows through the System, and includes examples of specific devices that can be used for receiving, configuring, storing, accessing, manipulating and communicating such data. The System may be implemented, however, by using devices equivalent to those disclosed in FIG. 2. The data enters the system via a Quotation Server such as the DSO Data Server Option 140 provided by CQG, Inc.

The quotation stream enters an IBM AT compatible PC through an RS-232 I/O port 141. The PC is composed of an Intel 486 CPU and is run by MS-DOS 5.0. The PC also has 4 MB of Random Access Memory (RAM). Installed on the PC is Windows 3.1 by Microsoft, and Steidlmayer's own Capital Flow Software. A software module 142 is used to capture and format the quotation stream to a linear database. 142.

Whitewater's "Wintrieve" ISAM Record Manager 143 is used to configure the data, and store it in two files. In the first file, the data has 5 fields 145: the date of the period, the time of the period start, the Hi price of the period, the Lo price of the period, and the Symbol name. In the second file, the data has 7 fields 146: the date of the unit beginning, the time of the unit beginning, the date of the unit end, the time of the unit end, the Hi price of the unit, the Lo price of the unit, and the Symbol name. The data files are stored on a 120 MB hard drive 144. The ISAM Record Manager also facilitates the accessing and retrieval of data from the hard drive, and acts as an interface between the database and a study conductor 147.

The user selects the study parameter and the data-segment parameters via an input device such as a 102 Key IBM Style Keyboard 148 or a Microsoft-compatible pointing device 149 (or mouse) or both. After the study conductor has performed the study, the study results can be viewed by the user on the display screen of a monitor such as a VGA Color CRT Monitor 150.

FIG. 3 is a schematic diagram of the method steps for generating vertical pipes, displaying study results within the pipes, and drawing reference points within a pipe. Step 1 of FIG. 3 is the determination of the range of the magnitude of data-event units in the user-selected data segment. The System reads sequentially through each of the data-event units in the user-selected data segment 14, and compares each one to the maximum and minimum units found in that data segment as of the time of the comparison 15, 16. If a given unit is greater than the then-defined maximum unit, the maximum unit is reset 17 to equal the given unit. Similarly, if the given unit is less than the then-defined minimum unit, the minimum unit is reset 18 to equal the given unit. After having evaluated each data-event unit in the data segment, the System converts the minimum unit to the yLo coordinate of the display, and converts the maximum unit to the yHi coordinate of the display using the lookup table 19. The lookup table creates one to one correspondence between magnitudes of successive data event units and their corresponding positions on the y-axis ("yCoordinates"). Each successive yCoordinate is spaced in increments equalling the size of the screen font.

In Step 2 of FIG. 3, the System draws the bounding lines of the vertical pipe so that the bounding line encompasses the entire range of magnitude of data event units in the selected data segment. The System gives the user the opportunity to specify the desired position for the vertical pipe on the display screen, e.g., left hand side, 1st position, furthest to the left. The System then sets up the coordinates to draw the Vertical Pipe lines, by first initializing coordinate x1 of the display to equal the x axis origin of the user-specified pipe position 20, and, second, initializing coordinate x2 to equal x1 plus the width 21 of the pipe. The System then draws the bounding lines—from x1, yLo to x1, yHi 22, and from x2, yLo to x2, yHi 23.

Step 3 of FIG. 3 provides for the invocation of the study conductor, followed by the mapping of the study results into the vertical pipe that has been previously drawn. The System calls up the study conductor to conduct the user-selected study type 24, and then passes the study parameters to the study conductor 25. The study conductor performs the study, and then passes the results back for storage in reservoir 1 (res1) 26, 27. For every data-event unit stored in res1 28, the System maps the unit to yCoordinate using a lookup table 29, and then draws a darkened box within the pipe boundaries at yCoordinate.30 The height of this box equals the size of the screen font. Once the System has displayed the study results, the user views those results to determine whether any points of minus development have been identified.

The System also provides the user with optional Step 4 in FIG. 3—the capability to mark a desired reference point, i.e., threshold, within a vertical pipe. A reference point can be supplied either by the user or by the study conductor. If this capability is utilized, the System maps each reference point to yCoordinate from the lookup table. 31,32. The System then resets the yCoordinate to enable the System to draw a line in the center of the magnitude of the selected data event unit, i.e., the darkened box.33. However, the System can be devised to enable the user to draw a line at any height within the darkened box. The System sets the x coordinates for the reference point, with the x1 coordinate equalling the origin of the pipe display (the x coordinate of the left-side boundary of the pipe)34 and the x2 coordinate equalling x1 plus the standard width of the pipe. 35 The System then draws the line from x1, yCoordinate to x2, yCoordinate, 35 thereby enabling the user to readily identify and see a defined reference point in relation to study results within a pipe.

Figure 4:
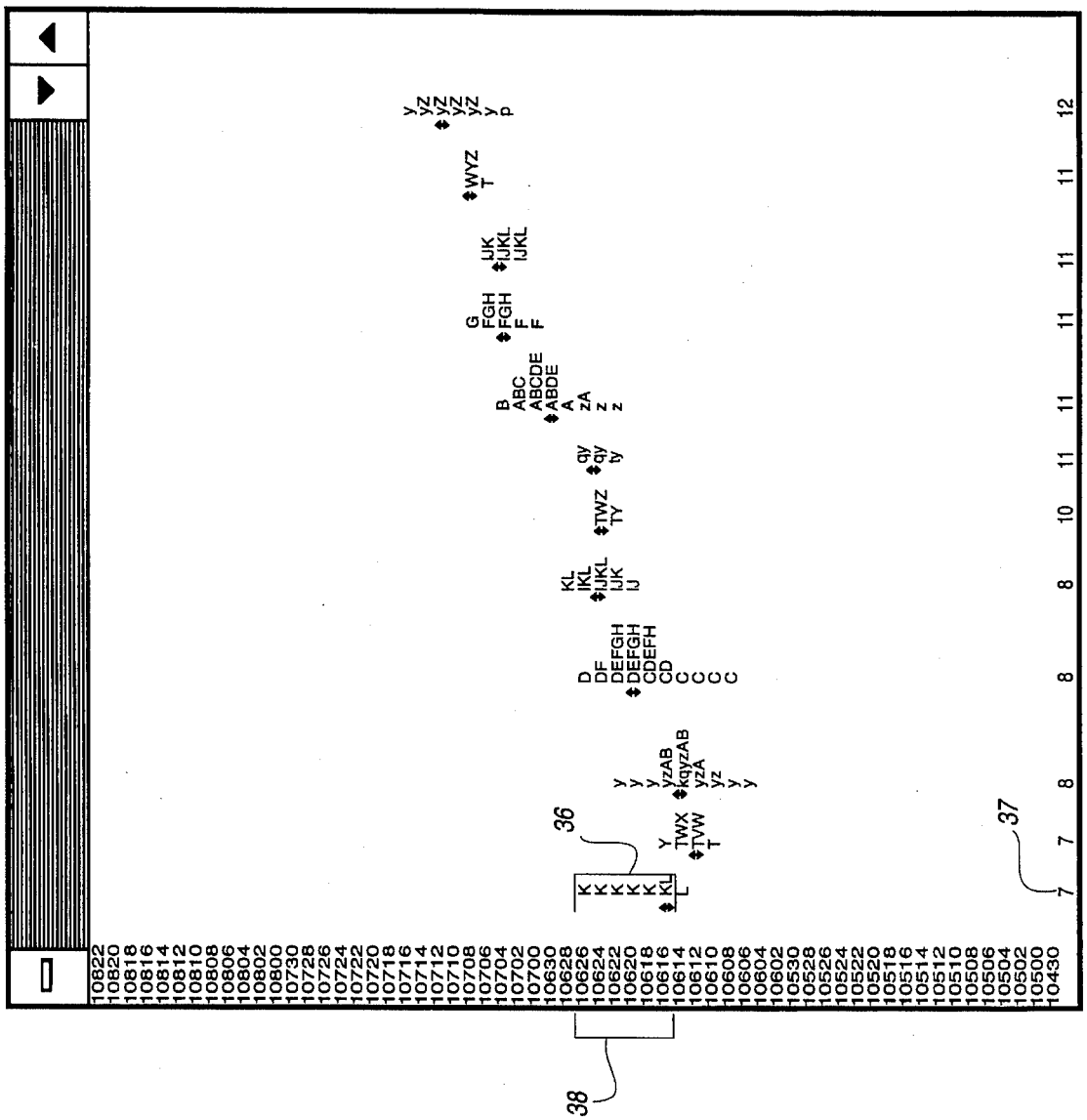
FIG. 4 is a sample data screen generated by the Capital Flow Software.

As discussed previously, one type of data event stream that is particularly suited for use with the System is the stream of continuous transaction prices from a futures market. The System has been used effectively with data configured and stored in a futures market transaction database called the Market Profile Database (the "Database"). The Database is owned by, and may be licensed from, the Board of Trade of the City of Chicago in Chicago, Ill. To fully understand the descriptions of System embodiments that follow, it would be useful to describe the organization of that database. FIG. 4 is a sample screen from the Capital Flow Software using data collected by the Database.

The Database organizes transaction price data in a linear format that reflects both the day and time period during which the transaction occurred and the price of the transaction. Each letter of the alphabet designates a specific half-hour time period for the exchange generating the data, e.g., the letter "A" represents the time period from 8:00 to 8:30 a.m. The Database keeps track of the range of prices during each half-hour time period on a given day, and then displays this information by using the letter representing the given time period to fill in all prices in the entire range of prices experienced during that time period. For example, assume that the letter "K" 36 represents the time period 1:00–1:30 p.m. In FIG. 4, the database tells us that on the seventh day 37 of the month, from 1:00–1:30, the range 38 of transaction prices went from 10616 to 10626. Note that this does not necessarily mean that a transaction occurred at each price in between these high and low prices; rather, the data display in FIG. 4 tells the user that on the 7th day of the month, between 1:00 and 1:30 p.m., the highest transaction price was 10626, and the lowest transaction price was 10616.36. The Database automatically fills in all prices between the high and low transaction prices for that period, and subsequently, for each given half-hour time period desired. Each letter in the Database is called a "time-price opportunity" ("TPO").

One embodiment of the System, shown in FIG. 5, provides a user with the capability to conduct a "TPO incidence review" study on data stored in the Database. In this embodiment, the continuous flow of futures market transaction prices enters the interface via a telephone line 39. The data flow interface 40 receives, reconfigures and stores the data in the Database 41. The user then selects a segment of data from the Database 42, and then instructs the System to perform the TPO incidence review study and selects the threshold parameter for that study 43. The selected data segment and the threshold parameter are communicated to the study conductor via an interface 44, which performs the TPO incidence review study.

In the first step of the TPO incidence review study, the System determines the price range of the selected data segment. For each data event unit in the user-selected data segment 45, the System compares that unit (the "current unit") to the unit of maximum magnitude in the data segment at that point in the study (the "maximum unit") 46. If the maximum unit is less than the current unit, the System resets the maximum unit to equal the current unit 47. Next, the System compares the current unit to the unit of minimum magnitude in the data segment at that point in the study (the "minimum unit") 48. If the minimum unit is greater than the current unit, the System resets the minimum unit to equal the current unit 49.

The second step of the TPO incidence review study involves the counting of TPOs at each price magnitude level in the price range extant in the user-selected data segment. At each price level 50, the System counts the number of TPOs in the selected data segment 51, 52. The System then stores the result 53.

Next, the System checks each price level in the selected data segment 54 to determine whether the accumulated TPO count at each level is greater than the threshold parameter 55. If so, the System adds that price level to the results list 56. If not, the System ignores the price level 57.

Once the System has completed the TPO incidence review study, the results list is communicated to the display screen 58. The results list is then displayed within the vertical pipe—those price levels whose accumulated TPOs exceed the threshold are filled in 59. The user then views the study results to determine whether there is a dislocation—which is depicted visually as a "space"—at a given price level within the study result.

As is known to those skilled in the art, after a data analysis system has conducted an initial study, the System can be instructed to automatically update the study results. That capability can be used here. Specifically, in the case of a TPO-counting study on a data segment that has no "stop-point," i.e. a segment that is continuous up to the current moment in time, the user can instruct the System to continuously update the study results displayed in the vertical pipe as new data enters the System.

In addition, in this System, once the user has conducted the initial TPO study, the user can conduct additional studies on different data segments and/or using different study thresholds. The System provides the user with the capability to refine the analysis by conducting a multiple succession of new studies and then viewing and comparing the study results within the same vertical pipe or between pipes on a single display screen 60. The user's objective is to find study thresholds and select data segments that will cause the System to identify and display basic changes or dislocations in the data—the points of "minus development". These changes or dislocations are displayed in the vertical pipe as a "space" or as a differently-colored segment within a study result or between the results of multiple studies. Through this refinement process, the System can be used flexibly to analyze, model and summarize large quantities of data in a concentrated form on a single screen. By identifying dislocations in the data stream, the user can observe current price movements and the unfolding of distributions and developments with reference to well-defined dislocations, and can make decisions about price movements and transaction opportunities based on those observations.

FIG. 6-A-G contains a series of screen snapshots depicting a user session with the System embodied in FIG. 5. FIG. 6-A shows a Database screen in which the user has selected a data segment from the 8th day 61 of the month to the 12th day 62 of the month. 62. FIG. 6-B shows a typical user interface; from this screen, the user can select the position of the vertical pipe on the single display screen, the type of study to be conducted 64, the study parameter 65, and the color of the pipe 66 and study result within the pipe 67. In FIG. 6-B, the user has selected a green vertical pipe to be generated in the first position on the right hand side of the screen. The user has also selected the TPO incidence review study, using a threshold parameter of two TPOs, and the study result will be displayed in green.

Given the data segment and study parameters selected in FIG. 6A and 6B, the System conducts the study and displays the study results in the vertical pipe 68, as shown in FIG. 6-C. As can be seen in FIG. 6-C, the user does not obtain his objective of finding minus development within the study result using the selected threshold parameter of 2.

The user therefore refines his analysis by selecting different parameters. In FIG. 6-D, the user makes the same choices as he made in the previous study except for a new threshold parameter of 4 69. The results of the second study are displayed in FIG. 6-E; this time, the user finds a space 70—indicating a dislocation in the futures market transaction data flow—at price level 10620.

To further refine his analysis, the user changes the study parameter again—to 10 TPOs 71. See FIG. 6-F. By selecting such a high threshold, the user obtains the study result shown in FIG. 6-G that displays a great deal of space—both space 72 above price level 10626 72 and space 73 below 10624.

FIG. 7-A-F contains a series of screen snapshots depicting an additional user session with the System embodied in FIG. 5. FIG. 7-A shows a Database screen depicting the study result 76 of a TPO incidence review study using a threshold parameter of 10, and performed on all data that is visible on the screen. This study result is included in FIG. 7-A to provide a basis for comparison to successive study results. Also in FIG. 7-A, the user has selected the data segment from the 8th day 74 of the month to the 11th day 75 of the month.

As depicted in FIG. 7-B, the user selects a TPO incidence review study 78 with a threshold parameter of 10. 81. The user directs the System to place the results of this study in a green 79 vertical pipe in the second position on the left hand side 77, with the study results displayed in green 80. The results 81 of the TPO incidence review study requested in FIG. 7-B are shown in FIG. 7-C.

In FIG. 7-D, the user then elects to perform a study on a portion of the remaining data from the Database screen— from the second cluster of the 12th day 82 of the month to the 13th 83 day of the month. The user, in FIG. 7-E, again selects a TPO incidence review study 84 with a threshold parameter of 10. 85. The results of this study are to be displayed in a green 86 vertical pipe in the second position 87 on the left hand side of the screen.

The results 89 of the study requested in FIG. 7-E are displayed in FIG. 7-F. In viewing this study result, the user can see two points of minus development: first, within the study result at price level 10704 88, and second, between the two study results at price level 10627–10628. 90. By identifying these points of minus development, the user is able to observe current price movements and the current unfolding of distributions and developments with reference to well-defined recent price behaviors and can make decisions about price movements and transaction opportunities based on those observations.

A second embodiment of the System, depicted in FIG. 8-A–8-E, provides a user with the capability to conduct moving average studies on data that is configured and stored in the Database. This embodiment differs from the embodiment described in FIG. 5 because it uses a different data unit as the base unit for conducting studies. Unlike the TPO incidence review embodiment, which conducts studies on TPOs, this embodiment conducts studies with reference to "control prices" that have been previously selected by the user and confirmed by the Capital Flow Software. As described previously, a "control price" is the price that emerges in a distribution, stopping and holding the distribution and enabling development to begin, centered around the control price. Although this particular embodiment discloses a moving average study performed on control prices identified by the use of Capital Flow Software, the System could be used with any type of moving average program, including those conducted on actual transaction price data.

FIG. 8-A is a sample screen showing the use of the Capital Flow Software to identify distribution and development and to select the control price for a particular distribution and development. Capital Flow Software enables the user to view a Database display screen and identify the natural distribution and development cycles in the market. Through the use of input means, the user groups sections of the data into discrete units called "distribution and development clusters" 91. For example, in FIG. 8-A, the user has split the display screen into 26 distribution and development clusters. The Capital Flow Software calculates a "control" price for each cluster selected by the user, and the user then either confirms the Software-generated control price or selects his own control price. The control price for each cluster is indicated by a small arrow 92.

The System embodiment in FIG. 8-A-F enables the user to conduct moving average studies of control prices previously identified by the use of Capital Flow Software. In this embodiment, the continuous flow of futures market transaction prices enters the interface via a telephone line 93. The data flow interface 94 receives the data, and the data is then reconfigured and stored in the Database. As noted previously, these three functions —receipt, configuration and storage—can be performed by a single module or by two or more separate modules. The user then sets up the control prices for a stream of data from the Market Profile Database to be studied using the Capital Flow Software 96. Once the database of control prices is established, the user selects a data segment from that database for study 97. As in FIG. 5, above, the System generates a vertical pipe based on the range of magnitude of control prices in that data segment 98. The user then instructs the System to conduct a moving average study on the user-specified data segment with the user-selected study parameter, N 99. N represents the aggregate number of successive control prices that will be averaged at each stage in the moving average analysis of a data segment. The System then generates on the display screen a vertical display pipe that equals in unit height the range of magnitude of data-event units in the user-selected data segment.

The System communicates these parameters via an interface 100 to the study conductor. The study conductor operation begins by positioning the database at the first control price in the user-selected data segment 101. The study conductor then determines the average of the next N control prices 102, and stores the resulting average for that stage in the first element of the average list 103.

Next, the study conductor determines the average of the next N control prices until reaching the end of the distribution clusters in the user-selected data segment and, in addition, tracks the minimum and maximum average amounts computed during the analysis of the data segment. For each control price in the data segment, the study calculator checks whether the number of remaining control prices in the data segment is greater than N. 104. If so, the study conductor increments the data position by one control price 105 and then calculates the average of the next N control prices 106 to compute the current-interval average. The study conductor then compares the current-interval average to the maximum average calculated prior to that point in the study analysis. 107. If the current-interval average is greater than the maximum average, the study conductor resets the maximum average to equal the current-interval average 108. Similarly, the study conductor compares the current-interval average to the minimum average calculated prior to that point in the study analysis 109. If the current-interval average is less than the minimum average, the study conductor resets the minimum average to equal the current-interval average 110. The study conductor then stores the current-interval average in the average list 111.

The next step in this embodiment is the creation of a list of prices for the pipe interior. The System places each price in the user-selected data segment that falls between the minimum average and the maximum average, inclusive, in the results list 112. The System then adds each average price in the average list to the additional reference points list 113. Finally, the results list and the additional reference points list are returned to the vertical pipe via an interface 114, and both lists are displayed on the screen within a vertical pipe 115. The user then views the study result on the display screen. Because moving average study results are necessarily fluid, the user will not be able to identify dislocations or space within a single study result. Instead, to obtain the objectives of using the System in this embodiment, the user must refine his analysis by conducting multiple studies and varying the data segment and study parameters until points of minus development are identified and visually displayed as space or differently colored segments within or between multiple study results. In addition, as is known to those skilled in the art, in data analysis systems individual data studies can be updated periodically at the user's direction; and that capability can be used here. Specifically, in the case of a moving average study of a data segment that has no stop point, the visual display of study results in the System can be updated by the user periodically as new data enters the System. To activate this capability, the user must compute additional control prices for the new distribution and development clusters and instruct the System to recalculate the moving average study.

FIG. 9-A-D is a series of screen snapshots depicting a user session with the System embodiment described in FIG. 8. In FIG. 9-A, the user has selected a moving average study 116 with a parameter of 4, i.e., N=4. 117. The results of this study will be displayed in a green vertical pipe in the first position on the left hand side of the screen 118, 119.

FIG. 9-B is the screen displaying the results of the study selected in FIG. 9-A. As shown on the screen, the minimum average price is 10622 120, and the maximum average price is 10706 121. The results list, which contains the entire range of average-price levels from the minimum average price to the maximum average price, is displayed in the vertical pipe as solid color. The additional reference points list, which contains each average price calculated by the study conductor shown, is displayed by drawing a clear line 122 at each average price level.

Since the user must conduct an additional study of the same or a different data segment in order to identify points of minus development, the screen shown in FIG. 9-C illustrates the user's selection of a second moving average study 123, using a study parameter of 6 124. The study results, displayed in FIG. 9-D, show space 125 in a larger portion of the pipe than that shown in results of the study with the lower parameter (as shown in FIG. 9-B). Accordingly, the user has refined his analysis through his selection of a greater moving average study parameter, which enabled identification of space that was not present in the result using the lower moving average study parameter and which therefore enabled the user to detect the emerging market activity sooner. Space could also be shown, by way of contrast, as a differently colored segment within the same display pipe if FIG. 9-B and 9-D were consolidated, as they can be in the System.

Another sample user session of the System embodiment in FIG. 8 is set forth in FIG. 10-A-F. FIG. 10-A is a display screen that shows the result 126 of a 4 unit moving average study performed on the continuous data segment displayed on the screen. This result is displayed in order to compare the study result from a continuous data segment to results of subsequent studies that will be conducted on successive data segments. FIG. 10-A also shows the user's selection of a fixed data segment (i.e having a start point and a stop point) for the next study—the segment ranging from the control price for the first cluster of the 8th day 127 of the month to the control price for the first cluster of the 11th day 128 of the month. FIG. 10-B shows the user's selection of a 4-unit moving average study 129, 130 to be performed on the fixed data segment selected by the user in FIG. 10-A. This study result is displayed here in a separate vertical pipe in the second position 131 on the left-hand side—adjacent to the continuous data segment study result. The result 132 for the study selected in FIG. 10-B is displayed in FIG. 10-C.

In FIG. 10-D, the user selects a data segment containing the remaining data on the display screen, ranging from the control price for the second cluster of the 11th day of the month to the control price for the sixth cluster of the 13th day 134 of the month. Again, the user instructs the System to perform a 4 unit moving average study 135, 136 to be displayed in a vertical pipe in the second position 137 on the left-hand side of the display screen. The result 138 is displayed in FIG. 10-F, and from this screen, the user is able to identify space 139 between the results of the two studies performed on successive data segments.

What is claimed is:

1. A computerized system for organizing, controlling, and managing data respecting financial events that are susceptible to organization and configuration in a linear data event series form that reflects inherent data event development, said system comprising:
   a. data source means,
   b. a data base constructor means for configuring data in data event unit form,
   c. interface means for receiving data from said data source means and transmitting the same to the data base constructor means,
   d. data storage means,
   e. means coupling said data base constructor means with the data storage means for receiving, configuring, and storing said data in linear data event series order with reference to both linear position and magnitude of each data event unit,
   f. user instructional input means for selecting data segment parameters within said data base,
   means responsive to said data segment parameters for accessing said data base and for defining data segments,
   h. study conductor means for performing user-designated data analysis studies on said user-selected data segments,
   i. said user instructional input means also operating to select study parameters to be used by said study conductor,
   j. visual display means having vertical lines display generator means for drawing vertical line boundaries for a visually-perceptible vertical display pipe or pipes, and
   k. study result production means for collecting and displaying results of the operation of said study conductor means in a visibly distinct manner in said vertical display pipe or pipes on a single visual display screen.

2. The system of claim 1 wherein said study conductor means includes data-event tabulating means.

3. The system of claim 1 wherein said study conductor means includes a variable data event/linear position averaging means.

4. The system of claim 1 wherein said data source means includes means for providing financial market transaction price data.

5. The system of claim 1 wherein said study conductor means includes means for updating study results continuously or periodically.

6. The system of claim 1 wherein said user instructional input means includes means capable of operating multiple times in consecutive succession.

7. The system of claim 6 wherein said means capable of successive operations includes means for applying user-designated data segment parameters and study parameters so as to identify within said segment data event locations lacking data event development responsive to said study parameters or said data segment parameters or both.

8. The system of claim 6 wherein said means capable of successive operations includes means for applying user-designated data segment parameters and study parameters so as to identify between separately studied segments data event locations lacking data development responsive to said study parameters or said data segment parameters or both.

9. The system of claim 7 or claim 8 including means for distinctly displaying data development shortcomings.

10. The system of claim 7 or claim 8 including means for displaying, by a distinct color band, data development shortcomings.

11. The system of claim 7 or claim 8 including means for displaying, in a uniform format regardless of the data segment studied or the type of study conducted, data development shortcomings.

12. The system of claim 1 including means coupling said visual display means with means for visibly marking the magnitude of a user-specified data event unit within said vertical display pipe or pipes.

13. The system of claim 1 including printing means connected to said visual display for printing said study results in hard-copy form.

14. A computerized method for receiving, controlling, and managing data respecting financial events susceptible to organization and configuration in linear data event series form that reflects inherent data event development, comprising the steps of:

providing data stream data received from a data source to a data base constructor and storage reservoir; configuring the data in the data base in linear data event series order with reference to both the linear position and the magnitude of each data event;

drawing a visually-perceptible vertical display pipe or pipes on a single computer screen, each pipe having vertical line boundaries corresponding to the range of magnitude of data event units in a user-designated data segment; and conducting studies on said data segments responsive to user-designated study parameters and displaying the study results of said studies in a clearly visible manner in said vertical display pipe or pipes.

15. The method of claim 14, further comprising the steps of conducting studies that include tabulating data events or averaging data events responsive to user-designated study parameters or data segment parameters or both.

16. The method of claim 14, further comprising the steps of conducting studies by utilizing a data-event incidence-threshold factor or a data event averaging factor, each factor being user-designated.

17. The method of claim 14, further comprising the steps of conducting a single study or a sequence of studies on a user-designated data segment responsive to user-designated study parameters that vary per study so as to locate within said segment and include in a clearly visible way in the display in said vertical display pipe or pipes data event locations lacking data event development responsive to said study parameters.

18. The method of claim 14, further comprising the steps of conducting a sequence of studies on user-parametered data segments responsive to user-designated study parameters, said data-segment parameters or study parameters, or both, varying per study, so as to locate between said study results and include in a clearly visible way in the display in said vertical display pipe or pipes data event locations lacking data development responsive to said study parameters or said data segment parameters or both.

19. The method of claim 17 or 18, further comprising the steps of clearly showing said development shortcomings as distinct colored bands within said vertical display pipe or pipes.

20. The method of claim 17 or 18, further comprising the steps of displaying said data development shortcomings in a uniform format regardless of the data segment studied or the type of study conducted.

21. The method of claim 14, further comprising the step of marking visibly the magnitude of a user-designated data event unit within said vertical display pipe or pipes.

22. The method of claim 14, further comprising the steps of updating study results in said vertical display pipe or pipes either continuously or periodically as new data is received.

23. A financial data susceptible to organization in a linear series, said system comprising means for receiving data from a data source and transmitting the same to a data base; organizing and storage means for configuring and storing said received data in a linear data event series data base that records both linear position units and data event magnitude units reflective of data event development; user instructional input means for selecting data segment parameters and for selecting study parameters; means for defining data segments within said data base; means for accessing said data base responsive to said data segment parameters and study conductor means for analyzing said data segments responsive to said study parameters; vertical lines display generator means for drawing on a visual display means vertical lines bounding a visually perceptible vertical display pipe or pipes, said drawn boundaries being responsive to said data segment parameters; and study result production means for collecting results of user-parametered studies in a visibly distinct manner in said vertical display pipe or pipes on a single visual display screen.

* * * * *